(12) United States Patent
Umeda et al.

(10) Patent No.: US 11,747,520 B2
(45) Date of Patent: Sep. 5, 2023

(54) OPTICAL THIN FILM HAVING METAL LAYER CONTAINING SILVER AND HIGH STANDARD ELECTRODE POTENTIAL METAL

(71) Applicant: FUJIFILM CORPORATION, Tokyo (JP)

(72) Inventors: Kenichi Umeda, Kanagawa (JP); Seigo Nakamura, Kanagawa (JP); Tatsuya Yoshihiro, Kanagawa (JP); Yuichiro Itai, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 691 days.

(21) Appl. No.: 16/929,100

(22) Filed: Jul. 14, 2020

(65) Prior Publication Data

US 2020/0348451 A1    Nov. 5, 2020

Related U.S. Application Data

(63) Continuation of application No. PCT/JP2018/044093, filed on Nov. 29, 2018.

(30) Foreign Application Priority Data

Jan. 30, 2018    (JP) ................. 2018-013884

(51) Int. Cl.
*G02B 1/115* (2015.01)
*G02B 1/116* (2015.01)
(Continued)

(52) U.S. Cl.
CPC .............. *G02B 1/115* (2013.01); *G02B 1/116* (2013.01); *G02B 5/285* (2013.01); *G02F 1/133502* (2013.01); *G02F 2201/38* (2013.01)

(58) Field of Classification Search
CPC .. G02B 1/11–118; G02B 5/285; G02B 5/286; G02F 1/133502; G02F 2201/38
See application file for complete search history.

(56) References Cited

U.S. PATENT DOCUMENTS

2004/0258928 A1    12/2004    Arbab et al.
2007/0166522 A1    7/2007    Beinat et al.
(Continued)

FOREIGN PATENT DOCUMENTS

CN    1572748 A    2/2005
CN    102141641 A    8/2011
(Continued)

OTHER PUBLICATIONS

English language translation of the following: Office action dated Dec. 13, 2021 from the DPMA in a German patent application No. 112018006975.3 corresponding to the instant patent application. This office action translation is submitted now in order to supplement the understanding of the cited references which are being disclosed in the instant Information Disclosure Statement.
(Continued)

*Primary Examiner* — Ryan S Dunning
(74) *Attorney, Agent, or Firm* — SOLARIS Intellectual Property Group, PLLC

(57) ABSTRACT

The optical thin film is provided on a substrate and includes, in order, from the substrate side, an interlayer, a silver-containing metal layer, and a dielectric layer, in which an anchor region including an oxide of an anchor metal is provided in an interface region of the silver-containing metal layer on a side close to the interlayer, a cap region including an oxide of the anchor metal is provided in an interface region of the silver-containing metal layer on a side close to the dielectric layer, a film thickness of the silver-containing metal layer is 6 nm or less, the silver-containing metal layer contains a high standard electrode potential metal, and a
(Continued)

peak position of a concentration distribution of the high standard electrode potential metal in a film thickness direction of the silver-containing metal layer is positioned closer to the interlayer than a peak position of a silver concentration distribution.

11 Claims, 11 Drawing Sheets

(51) Int. Cl.
*G02B 5/28* (2006.01)
*G02F 1/1335* (2006.01)

(56) References Cited

U.S. PATENT DOCUMENTS

| | | | |
|---|---|---|---|
| 2009/0246552 A1* | 10/2009 | Stoessel | B32B 27/36 427/164 |
| 2011/0188125 A1 | 8/2011 | Takenaka et al. | |
| 2012/0127578 A1 | 5/2012 | Bright et al. | |
| 2014/0153099 A1 | 6/2014 | Ogane | |
| 2017/0151754 A1 | 6/2017 | Yoshihiro et al. | |
| 2017/0198518 A1 | 7/2017 | Caillet et al. | |
| 2018/0095192 A1 | 4/2018 | Sonoda et al. | |
| 2018/0348510 A1 | 12/2018 | Yasuda | |
| 2020/0209433 A1 | 7/2020 | Umeda et al. | |

FOREIGN PATENT DOCUMENTS

| | | |
|---|---|---|
| CN | 102577657 A | 7/2012 |
| CN | 106536442 A | 3/2017 |
| CN | 107615101 A | 1/2018 |
| DE | 112018004832 T5 | 6/2020 |
| JP | H08-054507 A | 2/1996 |
| JP | 2001-324601 A | 11/2001 |
| JP | 2003-255105 A | 9/2003 |
| JP | 2006-184849 A | 7/2006 |
| JP | 2008-070459 A | 3/2008 |
| JP | 2009-521001 A | 5/2009 |
| JP | 2009-145644 A | 7/2009 |
| JP | 2013-41275 A | 2/2013 |
| JP | 2015-4919 A | 1/2015 |
| JP | 2015-94878 A | 5/2015 |
| WO | 2016/031133 A1 | 3/2016 |
| WO | 2016/189848 A1 | 12/2016 |
| WO | 2017/154302 A1 | 9/2017 |

OTHER PUBLICATIONS

International Search Report issued in International Application No. PCT/JP2018/044093 dated Jan. 15, 2019.
Written Opinion of the ISA issued in International Application No. PCT/JP2018/044093 dated Jan. 15, 2019.
English language translation of the following: Office action dated May 31, 2021 from the SIPO in a Chinese patent application No. 201880087849.3 corresponding to the instant patent application. This office action translation is submitted now in order to supplement the understanding of the cited references which are being disclosed in the instant Information Disclosure Statement.

* cited by examiner

OPTICAL THIN FILM HAVING METAL LAYER CONTAINING SILVER AND HIGH STANDARD ELECTRODE POTENTIAL METAL

CROSS-REFERENCE TO RELATED APPLICATIONS

This application is a continuation application of International Application No. PCT/JP2018/044093, filed Nov. 29, 2018, the disclosure of which is incorporated herein by reference in its entirety. Further, this application claims priority from Japanese Patent Application No. 2018-013884, filed Jan. 30, 2018, the disclosure of which is incorporated herein by reference in its entirety.

BACKGROUND OF THE INVENTION

1. Field of the Invention

The present disclosure relates to an optical thin film such as an antireflection film or a transparent conductive film, an optical element including an optical thin film, and an optical system including the optical element.

2. Description of the Related Art

In the related art, in a transparent substrate such as a lens formed of a light transmitting member such as glass or plastic, an antireflection film is provided on a light incident surface in order to reduce the loss of transmitted light caused by surface reflection.

For an antireflection film that exhibits a very low reflectance with respect to visible light, configurations of a fine uneven structure having a pitch shorter than the wavelength of visible light and a porous structure obtained by forming a large number of pores on the uppermost layer thereof are known. In a case of using an antireflection film having a structure layer of a fine uneven structure, a porous structure, or the like on the uppermost layer as a layer of low refractive index, a very low reflectance can be obtained in a wide wavelength range of a visible light region (refer to JP2015-094878A, JP2015-004919A, WO2016/031133A, or the like, hereinafter, referred to as Patent Documents 1, 2, and 3, respectively).

On the other hand, as an antireflection film having no structural layer on the surface, an antireflection film including a metal layer containing silver (Ag) in a laminate of dielectric films is proposed in JP2006-184849A (hereinafter, referred to as Patent Document 4), JP1996-054507A (JP-H08-054507A), (hereinafter, referred to as Patent Document 5), JP2003-255105A (hereinafter, referred to as Patent Document 6), and the like.

Patent Document 4 discloses a conductive antireflection layer in which a transparent thin film layer of high refractive index and a metal thin film layer are alternately provided on a transparent substrate. In addition, Patent Document 4 discloses that as a layer for protection from corrosion, a protective layer may be provided for upper and lower layers of the metal thin film layer. For the protective layer, metals such as zinc, silicon, nickel, chromium, gold, and platinum, alloys thereof, and oxides, fluorides, sulfides and nitrides of these metals may be used.

Patent Document 5 discloses an antireflection film including a thin metal layer that is interposed between a front coating layer and a back coating layer and is protected from scratches by a protective silicon nitride layer. For the coating layers, nickel, chromium, rhodium, platinum, tungsten, molybdenum, tantalum, an alloy of nickel and chromium, and the like may be used.

Patent Document 6 discloses an antireflection film that is formed by laminating a metal thin film layer and a metal oxide thin film layer on a substrate, in which an underlayer is provided between the substrate and the metal thin film layer in order to stabilize the metal thin film layer, and an interlayer is provided between the metal thin film layer and the metal oxide thin film layer. As the underlayer and the interlayer, metal thin film layers of silicon, titanium, and the like may be used.

SUMMARY OF THE INVENTION

However, in a case where a layer having silver as a main component is to be formed as a metal thin film layer, as described in Patent Documents 4 to 6, provided that a layer of a metal other than silver is formed as a protective layer or a coating layer on upper and lower layers of the metal thin film layer, there is a problem that the transparency of the optical thin film is lowered due to coloration with the metal. In addition, in a case where an oxide or a nitride is provided as in Patent Document 4, it is very difficult to form an extremely thin silver film having a thickness of, for example, 10 nm or less in the form of a flat film on the oxide or nitride. This is because silver aggregates and granulates. Thus, it is very difficult to obtain an optical thin film including an ultrathin silver film having high transparency and high flatness.

In addition, an optical thin film having a layer including silver as a main component whose transparency is improved by thinning is not limited to utilization as the above-mentioned antireflection film, and applications to a transparent conductive film and the like can also be considered. Thus, there is a strong need for such an optical thin film.

The present disclosure has been made in view of the above circumstances, and an object thereof is to provide an optical thin film including a metal thin film layer with high flatness and having high light transmittance. Another object of the present disclosure is to provide an optical element including the optical thin film and an optical system.

An optical thin film according to the present disclosure is an optical thin film that is provided on a substrate and comprises, in order, from the substrate side:

an interlayer; a silver-containing metal layer that contains silver; and a dielectric layer, in which an anchor region including an oxide of an anchor metal is provided in an interface region of the silver-containing metal layer on a side close to the interlayer, a cap region including an oxide of the anchor metal is provided in an interface region of the silver-containing metal layer on a side close to the dielectric layer, a film thickness of the silver-containing metal layer including the anchor region and the cap region is 6 nm or less, the silver-containing metal layer contains a high standard electrode potential metal which is a metal having a standard electrode potential higher than that of silver, and a peak position of a concentration distribution of the high standard electrode potential metal in a film thickness direction of the silver-containing metal layer is positioned closer to the interlayer than a peak position of a silver concentration distribution.

Here, the expression "containing silver" means that the content of silver included in the silver-containing metal layer is 50 atomic % or more.

In the optical thin film according to the present disclosure, it is preferable that the high standard electrode potential metal contained in the silver-containing metal layer is gold.

It is preferable that the optical thin film according to the present disclosure further comprises an anchor metal diffusion control layer having a Hamaker constant of $7.3 \times 10^{-20}$ J or more between the interlayer and the silver-containing metal layer.

In the optical thin film according to the present disclosure, it is preferable that the anchor metal diffusion control layer includes a metal oxide, a metal nitride, a metal oxynitride or a metal carbide.

In the optical thin film according to the present invention, it is preferable that the anchor metal diffusion control layer contains a Hf oxide.

Here, the expression "contains a Hf oxide" means that the content of Hf oxide in the anchor metal diffusion control layer is 20% by mol or more. It is more preferable that an occupancy ratio of Hf oxide in the anchor metal diffusion control layer is 50% by mol or more, and it is particularly preferable that the anchor metal diffusion control layer is constituted of only a Hf oxide (the occupancy ratio is 100%). The Hf oxide may include an oxygen defect, and in a case where the Hf oxide is expressed as $HfO_{2-x}$, X is preferably in a range of 0 to 1.5. In the following description, the Hf oxide is expressed as $HfO_2$ including a case where the Hf oxide includes an oxygen defect.

In the optical thin film according to the present disclosure, it is preferable that the anchor region includes an unoxidized anchor metal which is not oxidized, and a content ratio of the oxide of the anchor metal is larger than a content ratio of the unoxidized anchor metal.

In the optical thin film according to the present disclosure, it is preferable that the anchor metal is Ge, Sn, In, Ga, or Zn.

The optical thin film of the present disclosure may further comprise a fine uneven layer having an alumina hydrate as a main component on a surface of the dielectric layer.

In the optical thin film of the present disclosure, in a case where the fine uneven layer is provided, it is preferable that a film thickness of the silver-containing metal layer is less than 3.5 nm.

According to the present invention, there is provided an optical element comprising: an antireflection film formed of the optical thin film according to the present invention.

According to the present invention, there is provided an optical system comprising: a group lens in which a surface of the optical element according to the present invention on which the antireflection film is provided is arranged on outermost surfaces.

Here, the expression "outermost surfaces" refers to one side surfaces of lenses arranged at the ends of the group lens consisting of a plurality of lenses and refers to surfaces which become the end surfaces of the group lens.

The optical thin film according to the present disclosure comprises a silver-containing metal layer having high flatness and has excellent light transmittance.

DESCRIPTION OF THE PREFERRED EMBODIMENTS

Hereinafter, embodiments of the present invention will be described with reference to the drawings.

Figure 1:
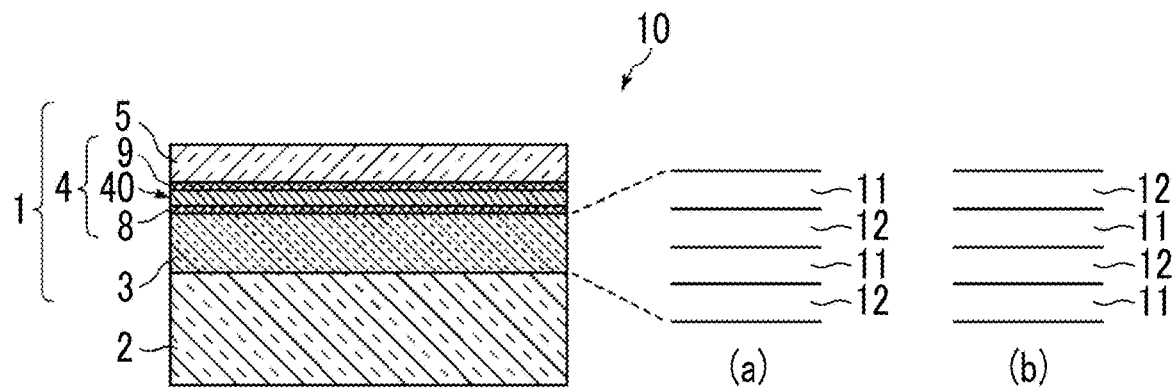
FIG. 1 is a schematic cross-sectional view showing a schematic configuration of an optical element including an optical thin film according to a first embodiment of the present invention.

FIG. 1 is a schematic cross-sectional view showing the schematic configuration of an optical element 10 including an optical thin film 1 according to a first embodiment of the present invention. The optical thin film 1 of the embodiment is formed on a substrate 2 and includes an interlayer 3, a silver-containing metal layer 4 that contains silver (Ag), and a dielectric layer 5 in this order from the substrate 2 side. Further, in the optical thin film 1, an anchor region 8 including an oxide of an anchor metal is provided in an interface region of the silver-containing metal layer 4 on a side close to the interlayer 3, and a cap region 9 including an oxide of the anchor metal is provided in an interface region of the silver-containing metal layer 4 on a side close to the dielectric layer 5. That is, here, the silver-containing metal layer 4 is handled as a layer including a silver-containing metal layer main body region 40, the anchor region 8, and the cap region 9. In the embodiment, the anchor region 8 is present between the silver-containing metal layer main body region 40 and the interlayer 3, and the cap region 9 is present between the dielectric layer 5 and the silver-containing metal layer main body region 40.

The shape of the substrate 2 is not particularly limited and the substrate is a transparent optical member (transparent substrate) that is mainly used in an optical device, such as a flat plate, a concave lens, or a convex lens, and also may be a substrate constituted by a combination of a curved surface having a positive or negative curvature and a flat surface. In addition, a flexible film may be used as the substrate 2. As the material for the substrate 2, glass, plastic, and the like can be used. Here, the term "transparent" means that the internal transmittance is 10% or more with respect to light in a wavelength range of 400 nm to 800 nm, that is, visible light.

The refractive index of the substrate 2 is not particularly limited and is preferably 1.45 or more. The refractive index of the substrate 2 may be 1.61 or more and 1.74 or more and further 1.84 or more. For example, the substrate 2 may be a high power lens such as a first lens of a group lens of a camera or the like. In the present specification, unless otherwise specified, the refractive index indicates a refractive index with respect to light having a wavelength of 550 nm.

The interlayer 3 may be a single layer or may be formed of a plurality of layers. The interlayer 3 is appropriately provided depending on the application and is basically constituted of a material transparent to visible light.

In a case where the optical thin film 1 is an antireflection film, it is preferable that the interlayer 3 is constituted of a plurality of layers in which a layer of high refractive index 11 and a layer of low refractive index 12 are alternately laminated as shown in (a) and (b) of FIG. 1. At this time, as shown in (a) of FIG. 1, the layer of low refractive index 12 and the layer of high refractive index 11 may be laminated in this order from the substrate 2 side, and as shown in (b) of FIG. 1, the layer of high refractive index 11 and the layer of low refractive index 12 may be laminated in this order from the substrate 2 side. In addition, the number of layers of the interlayer 3 is not limited, but is preferably set to 16 layers or less from the viewpoint of suppressing costs.

Regarding the layer of high refractive index 11 and the layer of low refractive index 12, the refractive index of the layer of high refractive index 11 may be higher than the refractive index of the layer of low refractive index 12. It is more preferable that the refractive index of the layer of high refractive index 11 is higher than the refractive index of the substrate 2 and the refractive index of the layer of low refractive index 12 is lower than the refractive index of the substrate 2.

The layers of high refractive index 11 or the layers of low refractive index 12 may not have the same refractive index. However, it is preferable that the layers are formed of the same material and have the same refractive index from the viewpoint of suppressing material costs, film formation costs, and the like.

Examples of the material for constituting the layer of low refractive index 12 include silicon oxide ($SiO_2$), silicon oxynitride (SiON), gallium oxide ($Ga_2O_3$), aluminum oxide ($Al_2O_3$), lanthanum oxide ($La_2O_3$), lanthanum fluoride ($LaF_3$), magnesium fluoride ($MgF_2$), and sodium aluminum fluoride ($Na_3AlF_6$).

Examples of the material for constituting the layer of high refractive index 11 include niobium pentoxide ($Nb_2O_5$), titanium oxide ($TiO_2$), zirconium oxide ($ZrO_2$), tantalum pentoxide ($Ta_2O_5$), silicon oxynitride (SiON), silicon nitride ($Si_3N_4$), and silicon niobium oxide (SiNbO).

The refractive index can be changed to some extent by controlling any of these compounds to have a constitutional element ratio which is shifted from the compositional ratio of the stoichiometric ratio or by forming a film by controlling the film formation density. The materials constituting the layer of low refractive index and the layer of high refractive index are not limited to the above compounds as long as the above refractive index conditions are satisfied. Further, unavoidable impurities may be included.

Each layer of the interlayer 3 is preferably formed by using a vapor phase film formation method such as vacuum deposition, plasma sputtering, electron cyclotron sputtering, or ion plating. According to the vapor phase film formation method, a laminated structure having various refractive indices and layer thicknesses can be easily formed.

The material for constituting the dielectric layer 5 is not particularly limited. In a case where the optical thin film 1 is an antireflection film, the refractive index is preferably 1.35 or more and 1.51 or less. In this case, examples of the material for constituting the dielectric layer 5 include silicon oxide ($SiO_2$), silicon oxynitride (SiON), magnesium fluoride ($MgF_2$), and sodium aluminum fluoride ($Na_3AlF_6$). Particularly preferable is $SiO_2$ or $MgF_2$. The refractive index can be changed to some extent by controlling any of these compounds to have the constitutional element ratio which is shifted from the compositional ratio of the stoichiometric ratio or by forming a film by controlling the film formation density.

The film thickness of the dielectric layer 5 is preferably about $\lambda/4n$ in a case in which a target wavelength is $\lambda$ and the refractive index of the dielectric layer is n. Specifically, the thickness of the dielectric layer is about 70 nm to 100 nm.

The silver-containing metal layer 4 is a metal layer containing 50 atomic % or more of silver. The silver in the silver-containing metal layer 4 is preferably 85 atomic % or more, and more preferably 90 atomic % or more. As described above, the silver-containing metal layer 4 has the anchor region 8 and the cap region 9 in the interface regions with adjacent layers, and the silver-containing metal layer 4 contains an anchor metal. Further, the silver-containing metal layer 4 contains a metal M having a higher standard electrode potential than that of silver (hereinafter, also referred to as a high standard electrode potential metal M or simply a metal M). By containing the metal M, the silver-containing metal layer 4 has higher durability compared to a layer formed only of silver. The silver-containing metal layer 4 may include a metal other than silver, the anchor metal, and the high standard electrode potential metal M.

The high standard electrode potential metal M includes gold (Au), palladium (Pd) and platinum (Pt). Among these metals, gold has the largest standard electrode potential and is suitable for corrosion prevention. From the viewpoint of the refractive index and the extinction coefficient, gold is also preferable. Since the refractive index of gold is as small as the refractive index of silver, the influence on antireflection performance is small.

In a case where the high standard electrode potential metal M is contained even in a small amount, the anticorrosion effect can be obtained, and as the amount thereof increases, the durability is improved. On the other hand, there is a correlation between the amount of the metal M (hereinafter, referred to as "the amount of metal added") and the amount of light absorption. In a case where the amount of the metal added increases, the absorption amount increases and the transmittance decreases. In a case where it is assumed that the optical thin film 1 of the embodiment is used as an antireflection film, the light absorption at a wavelength of 550 nm is desirably 10% or less.

From the viewpoint of obtaining high transparency, the amount of the metal added in the silver-containing metal layer 4 is preferably 20 atomic % or less, and more preferably 10 atomic % or less. On the other hand, from the viewpoint of improving the corrosion prevention properties and the flatness of the silver-containing metal layer 4, the amount of the metal added in the silver-containing metal layer 4 is preferably 3 atomic % or more and more preferably 5 atomic % or more.

Figure 2:
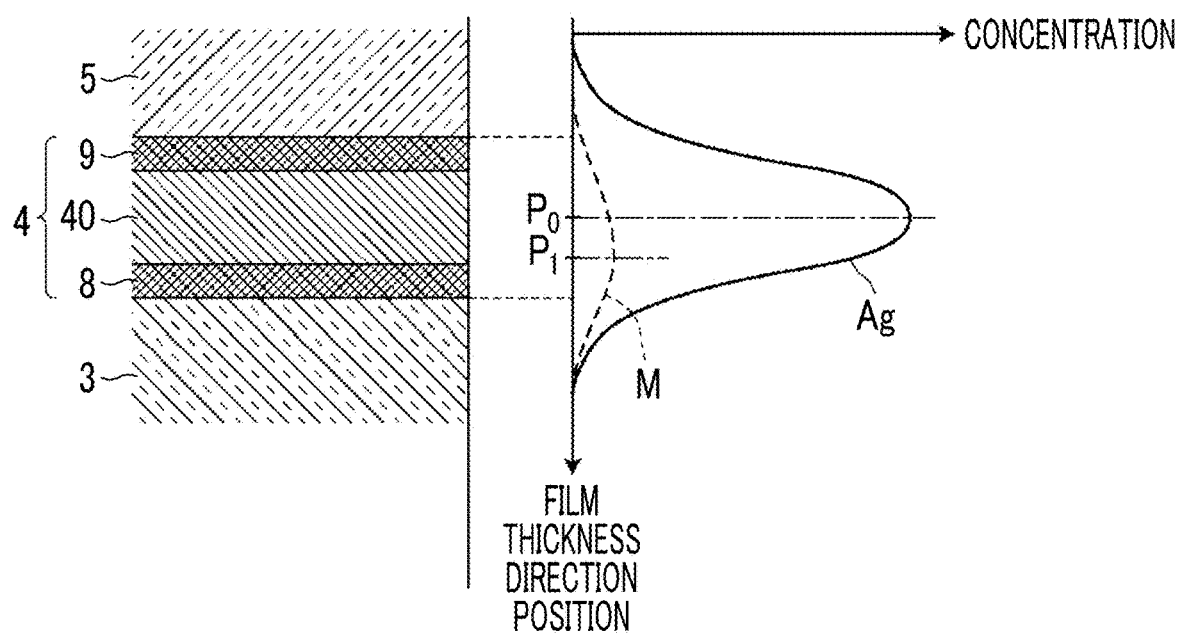
FIG. 2 is a view schematically showing a thickness direction structure of a silver-containing metal layer and the silver concentration distribution and a metal having a higher standard electrode potential in the film thickness direction.

Further, as shown in the concentration distribution of the constitutional elements in the film thickness direction of the silver-containing metal layer 4 in FIG. 2, a peak position $P_1$ in the concentration distribution of the metal M in the film thickness direction (the peak position of the concentration distribution of the metal M) is positioned closer to the interlayer 3 than the peak position $P_0$ in the silver concentration distribution in the film thickness direction (the peak position of the silver concentration distribution). The metal M has a concentration distribution that is generally closer to the interlayer 3 side in the silver-containing metal layer 4. The present inventors have found that as described above, in the thin and flat silver-containing metal layer 4, in the film thickness direction of the silver-containing metal layer 4, the metal M has a concentration distribution in which the peak position of the concentration distribution of the metal M is positioned closer to the interlayer 3 than the peak position of the silver concentration distribution.

Here, the anchor metal is a metal used for an underlayer (anchor metal layer) at the time of silver film formation for forming a flat silver-containing metal layer 4. The anchor metal has a function of suppressing granulation of the silver-containing metal layer, and contributes to flattening of the silver-containing metal layer 4. It is preferable that the anchor metal layer has a surface energy with a smaller difference with the surface energy of the silver-containing metal layer than with the surface energy of the interlayer.

The film thickness of the silver-containing metal layer 4 including the anchor region 8 and the cap region 9 in the optical thin film 1 is 6 nm or less, preferably 5 nm or less, and particularly preferably 4 nm or less. Further, the film thickness of the silver-containing metal layer 4 is more preferably 0.5 nm or more. Further, the film thickness is preferably 1.0 nm or more. The film thickness of the silver-containing metal layer is a value obtained by X-ray reflectance measurement. Specifically, for example, the film thickness can be obtained by measuring a signal near the critical angle using RIGAKU RINT ULTIMA III (CuK α-line at 40 kV and 40 mA), and extracting and fitting the obtained vibration component. Since the anchor metal is diffused into the silver-containing metal layer and the interface region thereof in the production process, the layers are optically integrally handled and the film thickness is also measured as the total film thickness of the anchor region, the silver-containing metal layer main body region, and the cap region as described above.

The anchor region 8 is a region formed by altering an anchor metal layer 7 that is formed of an anchor metal and has a thickness of 0.2 nm to 2 nm in the production process (refer to a production method described later). Here, the alteration means that mixing with other constitutional elements of the interlayer and the silver-containing metal layer, oxidation of a metal element or the like occurs and the state of the anchor metal layer becomes different from the state at the time of formation of the anchor metal layer.

Similarly, the cap region 9 is a region formed by making the anchor metal constituting the anchor metal layer 7 to pass through the silver-containing metal layer 4 and moving the anchor metal to the surface of the silver-containing metal layer 4 in the production process. This cap region 9 includes an oxide of the anchor metal oxidized by oxygen under an environment.

After the anchor metal layer 7 is altered to the anchor region 8 and the cap region 9, there is a case where the total film thickness of both regions 8 and 9 is increased with the oxidation of the anchor metal by about two times compared to the film thickness of the anchor metal layer 7.

Since the anchor region 8 and the cap region 9 are interface regions with adjacent layers, elements present in the adjacent layers are mixed in addition to the anchor metal and the oxide thereof. When the concentration distribution of the anchor metal in the depth direction (film thickness direction) of the silver-containing metal layer 4 is measured, two peaks are observed, one of the two peaks closer to the substrate is the peak of the anchor region, and the other farther from the substrate is the peak of the cap region.

The anchor metal layer formed of the anchor metal has a surface energy with a smaller difference with the surface energy of the silver-containing metal layer than with the surface energy of the anchor metal diffusion control layer. In the present specification, the surface energy (surface tension) γ is defined as a surface energy calculated using $\gamma=\gamma_0+(t-t_0)(d\gamma/dt)$ from Metal Data Book, edited by The Japan Institute of Metals, version No. 4, p. 16.

Hereinafter, the surface energies of various metal elements at room temperature calculated by the above method are exemplified.

TABLE 1

| Element | Surface energy γ (mN/m) |
|---|---|
| Bi | 395.22 |
| Pb | 507.26 |
| Sn | 558.49 |
| In | 567.844 |
| Mg | 778.1 |
| Nd | 778.91 |
| Zn | 848.98 |
| Ge | 857.34 |
| Si | 1045.05 |
| Ag | 1052.712 |
| Al | 1136.25 |
| Mn | 1333.2 |
| Cu | 1422.54 |
| Au | 1679.76 |
| Pd | 1835.94 |
| Hf | 2032.78 |
| Ga | 718 |
| Ti | 2081.6 |
| Cr | 2292 |
| Ir | 2317.983 |
| Ni | 2321.02 |
| Co | 2592.32 |
| Fe | 2612.39 |
| Ta | 2888 |
| Mo | 3024.6 |
| W | 3472.08 |

In a case where the silver-containing metal layer is a silver film, according to the above table, the surface energy is 1053 mN/m. In contrast, specifically, for the interlayer or the anchor metal diffusion control layer described later, a metal oxide, a metal nitride, a metal oxynitride or a metal carbide may be used and these generally have surface energy smaller than the surface energy of the metal. For example, the surface energies of $TiO_2$, $HfO_2$, and $Ta_2O_5$ are respectively about 350 mN/m, 330 mN/m, and 280 mN/m, and a difference with the surface energy of the silver film is more than 700 mN/m.

In a case where an ultrathin film of silver (6 nm or less) is directly formed on a film, such as an oxide or nitride film, having a large difference with the surface energy of the silver film, a case where silver particles are bonded to each other is more stable than a case where the silver is bonded with the oxide or nitride. Thus, grain growth of the silver is promoted. Therefore, it is difficult to form a smooth ultrathin film. During the investigation conducted by the present inventors, the inventors have found that in order to obtain a smooth ultrathin film, it is effective to provide an anchor metal layer of a metal oxide or nitride having a surface energy close to the surface energy of the silver film on the deposition surface of the silver film. By providing the anchor metal layer, the growth of silver crystal grains is suppressed and thus a flat ultrathin film can be obtained.

As the anchor metal, among the metal elements exemplified in Table 1, an anchor metal can be appropriately selected from bismuth (Bi), lead (Pb), tin (Sn), indium (In), magnesium (Mg), zinc (Zn), gallium (Ga), germanium (Ge), silicon (Si), aluminum (Al), manganese (Mn), and copper (Cu), whose surface energy satisfies a range of about more than 350 mN/m and less than 1500 mN/m, and used according to the constitutional material of the anchor metal diffusion control layer.

The surface energy of the anchor metal is preferably more than 350 mN/m and 1500 mN/m or less, and more preferably 500 mN/m or more. Accordingly, Pb, Sn, In, Mg, Zn, Ga, Si, Cu, and Ge are preferable. According to the investigation of the present inventors, from the viewpoint of suppressing an increase in particle size of Ag, In, Ga, and Ge are preferable, and Ge is particularly preferable. The anchor metal may not be a single metal but may include two or more metals.

When the anchor metal layer is formed, an alloy layer formed of two or more metals may be formed and when the anchor metal layer is formed, a plurality of layers each formed of a single metal may be laminated.

On the other hand, there is a concern of lowering of transparency due to the metal constituting such an anchor metal layer, but it is found that the anchor metal is effectively oxidized to form a metal oxide so that the transparency can be improved.

In the production of the optical thin film of the present disclosure, after the formation of the anchor metal layer formed of the anchor metal, a silver film is formed without being exposed to oxygen, and thus the silver-containing metal layer can be flattened.

There is a case where an anchor metal that is oxidized (anchor metal oxide) and an anchor metal that is not oxidized (unoxidized anchor metal) are mixed in the anchor region. However, it is desirable that the content ratio of the anchor metal oxide is larger than the content ratio of the unoxidized anchor metal, and it is particularly preferable that the anchor metal included in the anchor region is fully oxidized. The magnitude relationship between the content ratio of the anchor metal oxide and the content ratio of the unoxidized anchor metal in the anchor region can be confirmed based on the signal intensity ratio in measurement by X-ray photoelectron spectroscopy (XPS).

The cap region is considered to have an effect of preventing silver from aggregating and growing into a granular form during application of an annealing treatment. At the stage of film formation in which another metal layer is formed on the anchor metal layer, the movement of the anchor metal to the laminated surface starts to occur, and the anchor metal is exposed to the atmospheric air in a state in which the anchor metal is present on the laminated surface to cause oxidation of the anchor metal.

It is considered that the anchor metal becomes more stable by becoming an oxide, and cap performance such as silver movement suppression, aggregation suppression, long-term stability, water resistance and moisture resistance is improved. The most part of the anchor metal of the cap region is oxidized by performing an annealing treatment in the presence of oxygen. In this case, it is preferable that 80% or more of the anchor metal included in the cap region is oxidized and it is more preferable that all of the anchor metal in the cap region is oxidized to form an anchor metal oxide. For example, in a case where the anchor metal is Ge, it is preferable to satisfy Ge/O≤1/1.8 and it is particularly preferable to satisfy Ge/O=½.

It is possible to form a silver-containing metal layer having a thickness of 10 nm or less by providing the anchor metal layer as described above. On the other hand, the present inventors have found that in order to set the film thickness of the silver-containing metal layer 4 to 6 nm or less, the diffusion of the anchor metal constituting the anchor metal layer has to be controlled. As the silver-containing metal layer becomes thinner, the anchor metal easily moves to the surface side of the silver-containing metal layer. In a case where the amount of the anchor metal remaining on the interlayer side of the silver-containing metal layer is reduced, the stability of the silver-containing metal layer as a film is lowered, the flatness is not retained, and partial aggregation or the like occurs in some cases. However, according to the technique of the present disclosure, it is possible to obtain a flat silver-containing metal layer having a thickness of 6 nm or less in which granulation is suppressed. It is considered that the high standard electrode potential metal, which has a concentration peak closer to the interlayer than the concentration peak of silver in the concentration distribution in the thickness direction of the silver-containing metal layer, exhibits an effect of suppressing the diffusion of the anchor metal.

The mechanism of suppressing the diffusion of the anchor metal by introducing the high standard electrode potential metal is not clear. The present inventors have found that, for example, in a case where the anchor metal is Ge and the metal M is Au, Ge and Au have a stronger liquid-liquid interaction compared to Ge and Ag, which contributes to suppression of the diffusion of the anchor metal.

The silver-containing metal layer 4 of the optical thin film 1 of the embodiment can be obtained through steps of forming an anchor metal layer and a metal layer formed of a high standard electrode potential metal on the interlayer before forming a silver film, forming the silver film on the anchor metal layer or the metal layer formed of the high standard electrode potential metal, and then performing an annealing treatment under an oxygen-containing atmosphere. The order of lamination of the anchor metal layer and the metal layer formed of the high standard electrode potential metal is not limited, but the order of laminating the anchor metal layer first and then the metal layer formed of the high standard electrode potential metal is more preferable. In the silver-containing metal layer obtained after the film forming step and the annealing treatment step, the peak position of the concentration of the high standard electrode potential metal in the film thickness direction is positioned closer to the interlayer than the peak position of the concentration of silver. Both the concentration distribution of the high standard electrode potential metal and the silver concentration distribution in the thickness direction of the silver-containing metal layer show a single peak.

Figure 3:
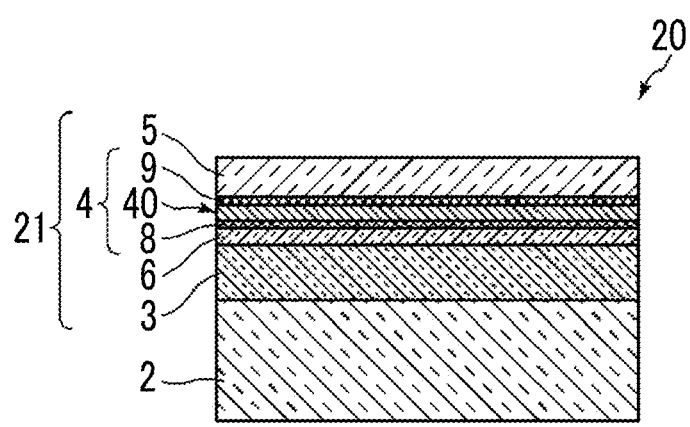
FIG. 3 is a schematic cross-sectional view showing a schematic configuration of an optical element including an optical thin film according to a second embodiment of the present invention.

FIG. 3 is a schematic cross-sectional view showing a schematic configuration of an optical element 20 including an optical thin film 21 according to a second embodiment of the present invention.

Regarding the optical thin film 21, points different from the optical thin film 1 according to the first embodiment will be described. The same elements will be denoted by the same reference numerals and the detailed description thereof will be omitted.

The optical thin film 21 of the embodiment is different from the optical thin film 1 in that the optical thin film 21 includes an anchor metal diffusion control layer 6 having a Hamaker constant of $7.3\times10^{-20}$ J or more between an interlayer 3 and a silver-containing metal layer 4, and an anchor region 8 is positioned between an anchor metal diffusion control layer 6 and a silver-containing metal layer main body region 40. By providing the anchor metal diffusion control layer 6, the diffusion of the anchor metal can be further suppressed, and the flatness of the silver-containing metal layer 4 can be further improved.

For the anchor metal diffusion control layer 6, a force for attracting the anchor metal is important. The investigation has been conducted by focusing on the Hamaker constant, which is an index of van der Waals force known as a force for attracting substances. As a result, it has been found that by providing the anchor metal diffusion control layer 6 having a Hamaker constant of $7.3\times10^{-20}$ J or more, the diffusion of the anchor metal is further suppressed, and thus a ultrathin silver-containing thin film layer having high uniformity in the order of several nm can be formed. In a case where in the silver-containing metal layer, a high standard electrode potential metal having a peak position of the concentration distribution closer to the interlayer than the peak position of the silver concentration distribution in the thickness direction of the silver-containing metal layer is included, and the anchor metal diffusion control layer 6 is further provided on the deposition surface of the silver-containing metal layer, an ultrathin silver-containing metal layer having higher flatness and having a film thickness of 4 nm or less, 3 nm or less, and further 2 nm or less can be obtained.

The Hamaker constant can be obtained as follows based on the van Oss theory. The surface energy $\gamma$ is divided into three components of a Lifshitz vdW (van der Waals) term ($\gamma^{LW}$), a donor term ($\gamma^-$), and an acceptor term ($\gamma^+$) and calculated as $\gamma=\gamma^{LW}+2(\gamma^+\gamma^-)^{1/2}$. The contact angles of three liquids of water, diiodomethane, and ethylene glycol are measured and the Lifshitz vdW term ($\gamma^{LW}$) in the surface energy of the thin film is calculated. Then, the Hamaker constant $A_{11}$ is calculated from $A_{11}=24\pi D_0^2\gamma^{LW}$. Intermolecular and Surface Forces (3rd edition), J. N. Israelachvili, Asakura Shoten, (translated by Hiroyuki Oshima) is referred to and $D_0=0.165$ nm is adopted (from the rule of thumb).

As already described above, a certain degree of anchor metal diffusion is preferable for forming the cap region and the Hamaker constant is preferably $30.0\times10^{-20}$ J or less.

The material for the anchor metal diffusion control layer 6 is not particularly limited as long as the Hamaker constant is $7.3\times10^{-20}$ J or more. However, the material is preferably transparent to visible light and preferably contains a metal oxide, a metal nitride, a metal oxynitride or a metal carbide to obtain sufficient transparency. Specific examples of constitutional materials include an oxide, nitride, oxynitride, or carbide of Si, Nb, Hf, Zr, Ta, Mg, Al, La, Y, or Ti, and a mixture thereof. Generally, since a nitride of a metal has a larger Hamaker constant than an oxide of the same metal, the effect of suppressing the diffusion of the anchor metal is high. On the other hand, an oxide of a metal is more transparent than a nitride thereof. More specifically, examples thereof include MgO ($A_{11}=7.3\times10^{-20}$ J), $Ta_2O_5$ ($A_{11}=9.5\times10^{-20}$ J), $Al_2O_3$ ($A_{11}=9.6\times10^{-20}$ J), $TiO_2$($A_{11}=10\times10^{-20}$ J), $HfO_2$ ($A_{11}=11.2\times10^{-20}$ J), $ZrO_2$ ($A_{11}=11.8\times10^{-20}$ J) $Si_3N_4$ ($A_{11}=9.5\times10^{-20}$ J), and $Nb_2O_5$ ($A_{11}=12\times10^{-20}$ J). The numbers in the parenthesis indicate the Hamaker constant $A_{11}$. It is preferable that the anchor metal diffusion control layer particularly contains an Hf oxide ($HfO_2$). It is more preferable that the occupancy ratio of Hf oxide in the anchor metal diffusion control layer is 50% by mol or more and it is particularly preferable that the anchor metal diffusion control layer is constituted of only $HfO_2$ (the occupancy ratio is 100% by mol). By using $HfO_2$ for the anchor metal diffusion control layer, the uniformity (flatness) of the silver-containing metal layer can be enhanced.

The film thickness of the anchor metal diffusion control layer 6 is preferably 5 nm or more and 100 nm or less to improve the adhesiveness with the silver-containing metal layer 4.

The layer of the interlayer 3 to be laminated on the side closest to the silver-containing metal layer may also function as the anchor metal diffusion control layer as long as the Hamaker constant is $7.3\times10^{-20}$ J or more. In this case, as long as the condition as the anchor metal diffusion control layer is satisfied, the layer of low refractive index or the layer of high refractive index in the interlayer 3 may be used.

The optical thin film of the present disclosure may include, in addition to the layers provided in the optical thin films of each of the above embodiments, other functional layers such as a protective layer having a protective function of suppressing oxidation of the silver-containing metal layer. In addition, in the film formation of each layer constituting the optical thin film, regarding layers other than the silver-containing metal layer, in a case where an ultrathin layer in the order of nm is formed, it is difficult to form a uniform film, and actually, an uneven film or parts (sea) not partially formed into a sea-island shape may be formed.

Figure 4:
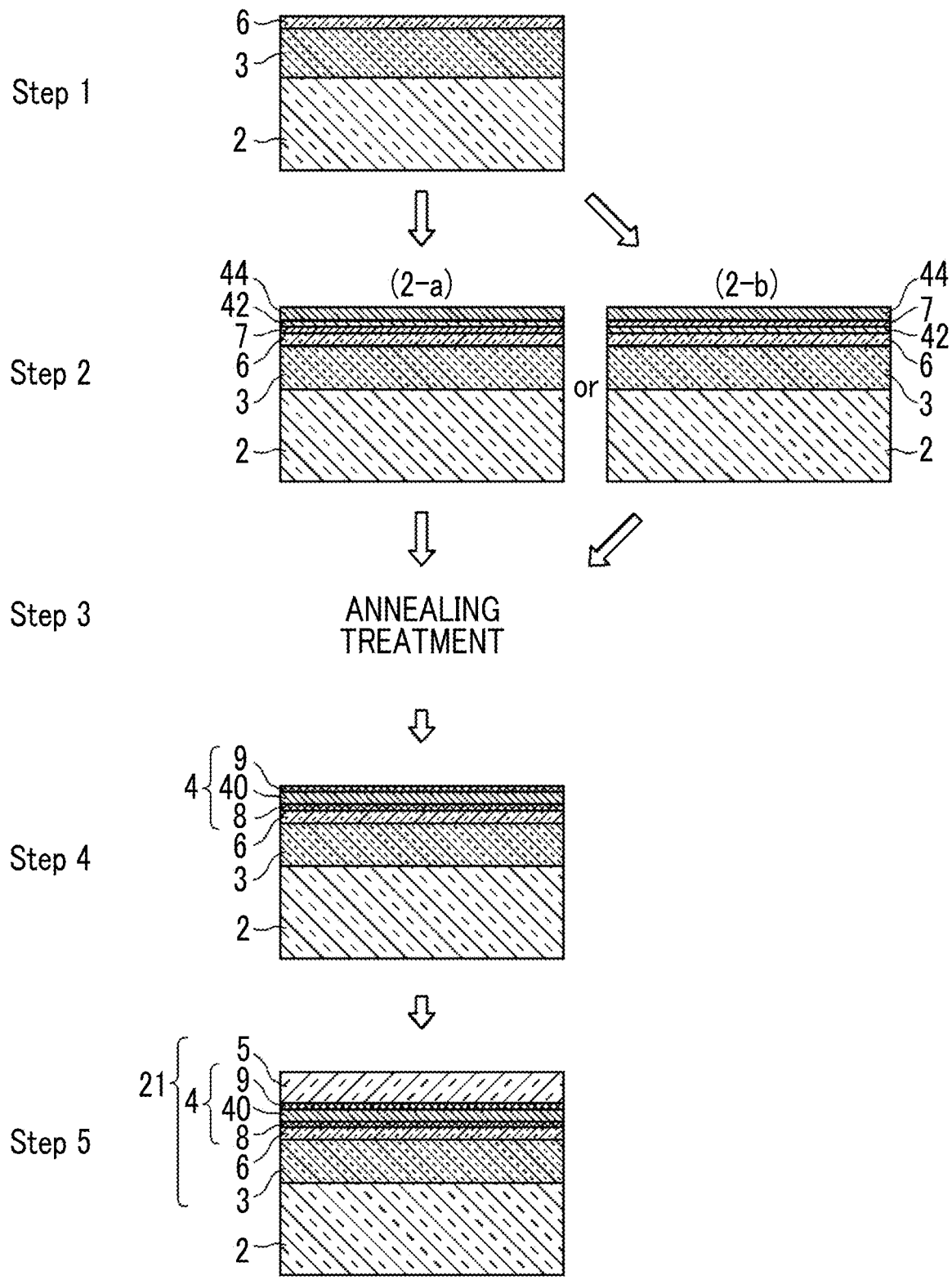
FIG. 4 is a diagram of a production step of the optical thin film according to the second embodiment.

A method for producing the optical thin film 21 according to the second embodiment shown in FIG. 3 will be described. FIG. 4 is diagram showing a production step of the optical thin film 21.

The interlayer 3 is formed on the substrate 2, and further the anchor metal diffusion control layer 6 is formed (Step 1).

Thereafter, the anchor metal layer 7 formed of an anchor metal is formed, and the metal layer 42 formed of a high standard electrode potential metal and the silver film 44 are formed in this order ((2-a) in Step 2). Alternatively, after the metal layer 42 formed of the high standard electrode potential metal is formed, the anchor metal layer 7 and the silver film 44 are formed in this order ((2-b) in Step 2).

The film formation of the anchor metal layer 7, the metal layer 42 formed of the high standard electrode potential metal, and the silver film 44 is performed in an oxygen-free atmosphere.

Thereafter, the substrate 2 on which the interlayer 3, the anchor metal diffusion control layer 6, the anchor metal layer 7, the metal layer 42 formed of the high standard electrode potential metal, and the silver film 44 are laminated is exposed to the atmospheric air and an annealing treatment is performed in the atmospheric air (Step 3). The annealing temperature is preferably 100° C. to 400° C., more preferably 200° C. to 350° C., and particularly preferably 250° C. to 300° C. Although the heating time is not particularly limited, the heating time is such that the peak position in the concentration distribution of the high standard electrode potential metal in the film thickness direction is positioned closer to the interlayer than the peak position in the silver concentration distribution. For example, the heating time is 1 minute or longer and 10 minutes or shorter, preferably 5 minutes or shorter, and more preferably shorter than 5 minutes.

In the film formation step (Step 2), the diffusion of the anchor metal starts, and the anchor metal moved to the deposition surface of the laminate starts to be oxidized at a stage in which the substrate 2 is exposed to the atmospheric air. When the annealing treatment is started, some of the anchor metal in the anchor metal layer 7 already has passed through the silver film 44 or the silver film 44 and the metal layer 42 formed of the high standard electrode potential metal, and a precursor region of a cap region is formed on the surface. On the other hand, the anchor metal layer 7 becomes a region in the middle of alteration into an anchor region.

Then, the diffusion and oxidation of the anchor metal are promoted by the annealing treatment (Step 3), and after this annealing treatment, the anchor metal layer 7 is altered into the anchor region 8 and the cap region 9 is formed on the surface of the laminate (Step 4).

Thereafter, the dielectric layer 5 is formed on the cap region 9 which is the outermost surface of the laminate (Step 5).

Through the above steps, the optical thin film 21 of the embodiment shown in FIG. 3 can be prepared.

The optical thin films according to the first and second embodiments of the present invention can be used as a transparent conductive film or an antireflection film. The optical thin film is particularly suitable for an antireflection film and can be applied to the surface of various optical members. Since the optical thin films of the first and second embodiments described above do not have an uneven structure or a porous structure, the mechanical strength is high, and the optical thin films can be applied to the surface touched by the hand of a user. Since the optical thin film can be applied to a lens surface of high refractive index, for example, the optical thin film is suitable for the outermost surface of a known zoom lens described in JP2011-186417A.

Next, an optical thin film according to a third embodiment of the present invention will be described.

Figure 5:
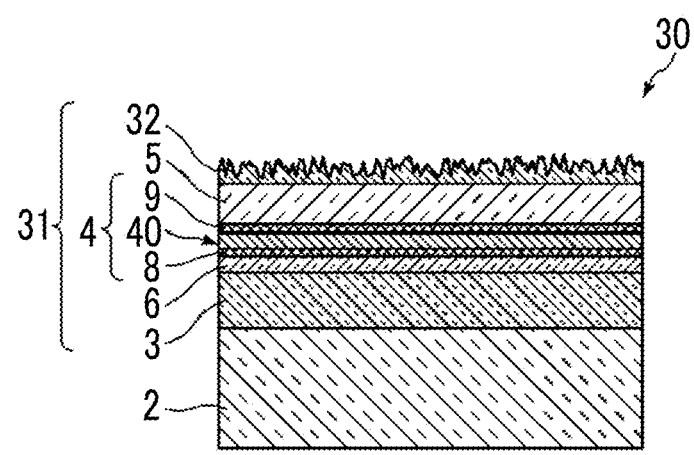
FIG. 5 is a schematic cross-sectional view showing a schematic configuration of an optical element including an optical thin film according to a third embodiment of the present invention.

FIG. 5 is a schematic cross-sectional view showing a schematic configuration of an optical element 30 including an optical thin film 31 according to a third embodiment. Also in the embodiment, differences between the optical thin film 31 and the optical thin film 1 according to the first embodiment will be described in detail. The same elements will be denoted by the same reference numerals and the detailed description thereof will be omitted. As shown in FIG. 5, the optical thin film 31 of the embodiment is formed by laminating an interlayer 3, a silver-containing metal layer 4, and a dielectric layer 5 on a substrate 2 in this order. In the optical thin film 31, an anchor metal diffusion control layer 6 having a Hamaker constant of $7.3 \times 10^{-20}$ J or more is provided between the interlayer 3 and the silver-containing metal layer 4. Further, in the optical thin film 31, an anchor region 8 including an oxide of an anchor metal is provided in an interface region of the silver-containing metal layer 4 on the side close to the anchor metal diffusion control layer 6, and a cap region 9 including an oxide of the anchor metal is provided in an interface region of the silver-containing metal layer 4 on the side close to the dielectric layer 5. The configuration up to this point is the same as that of the optical thin film 21 of the second embodiment, but the optical thin film 31 of the third embodiment further includes a fine uneven layer 32 having an alumina hydrate as a main component on the surface of the dielectric layer 5. A configuration without the anchor metal diffusion control layer 6 may be employed.

The fine uneven layer 32 has an alumina hydrate as a main component. Here, the main component is a component at a content of 80% by mass or more among the constitutional components of the fine uneven layer. Here, the alumina hydrate means boehmite which is an alumina monohydrate (expressed as $Al_2O_3 \cdot H_2O$ or $AlOOH$), bayerite which is an alumina trihydrate (expressed as $Al_2O_3 \cdot 3H_2O$ or $Al(OH)_3$), and the like.

The fine uneven layer 32 is transparent and although the size (apex angle size) and the direction of convex portions are various, the fine uneven layer has an approximately sawtooth-shaped cross section. The distance between the convex portions of the fine uneven layer 32 refers to a distance between the apexes of the most adjacent convex portions separated by a concave portion. The distance is equal to or less than the wavelength of light of which reflection is to be prevented. The distance is preferably of the order of several tens of nm to several hundreds of nm, more preferably 200 nm or less, and even more preferably 150 nm or less.

The fine uneven layer 32 can be obtained by forming a thin film of a compound including aluminum, and immersing the thin film of the compound including aluminum in hot water of 70° C. or higher for 1 minute or longer to perform a hot water treatment. In particular, it is preferable to perform a hot water treatment after an aluminum film is formed by vapor phase deposition such as vacuum evaporation, plasma sputtering, electron cyclotron sputtering, ion plating, and the like.

The optical thin film 31 of the embodiment is particularly suitable as an antireflection film, and has a very low reflectance for visible light. From the viewpoint of further improving the antireflection performance, the film thickness of the silver-containing metal layer 4 including the anchor region 8 and the cap region 9 is preferably less than 3.5 nm. The film thickness of the silver-containing metal layer 4 is preferably 0.5 nm or more, and more preferably 1.0 nm or more.

Even in a case where the film thickness is 3.5 nm or more, a very low reflectance can be realized as an antireflection film by providing the fine uneven layer on the surface. However, in the configuration including the fine uneven layer, the effect of reducing the reflectance by providing the silver-containing metal layer 4 is significantly enhanced by setting the film thickness to less than 3.5 nm.

In a configuration including the fine uneven layer of boehmite like the optical thin film 31 of the third embodiment, compared to a configuration not including the fine uneven layer like the optical thin films 1 and 21 of the first and second embodiments, a very low reflectance is obtained. On the other hand, the rubbing resistance is much higher in a case where the fine uneven layer is not provided. Therefore, in a case where the optical thin film according to the present disclosure is used as an antireflective film, the configuration having the fine uneven layer or the configuration not having the fine uneven layer may be appropriately used depending on the application.

Next, an embodiment of an optical system of the present invention will be described.

The optical system according to the embodiment includes a group lens including a lens as a substrate and an optical element in which the optical thin film 1 according to the first embodiment is provided on the surface of the lens. Here, the optical thin film 1 is provided as an antireflection film (hereinafter, referred to as an antireflection film 1).

Figure 6:
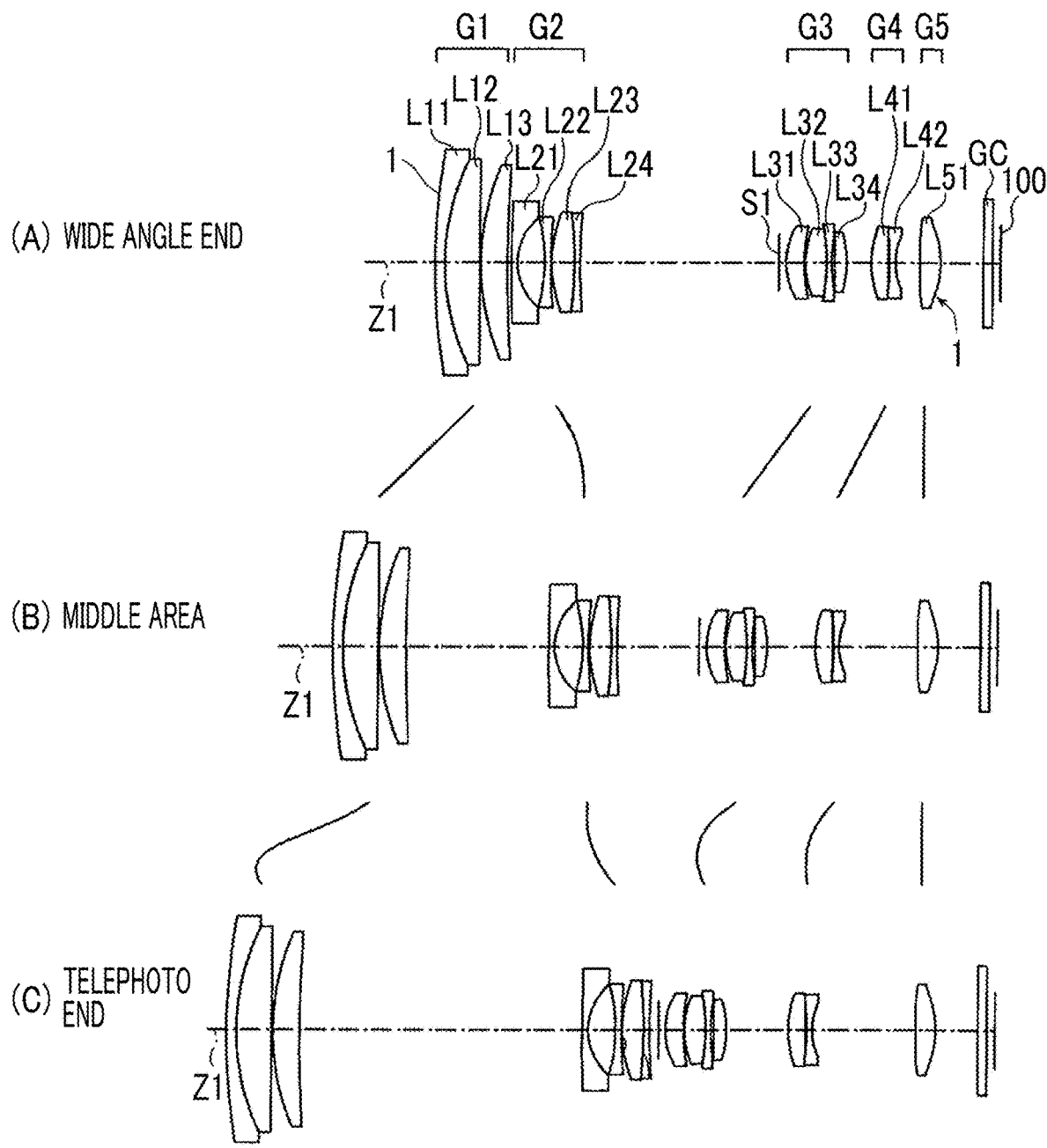
FIG. 6 is a diagram showing an example of a configuration of an optical system consisting of a group lens including the optical element according to one embodiment of the present invention.

(A), (B), and (C) of FIG. 6 show configuration examples of a zoom lens which is an embodiment of the optical system according to the present invention. The zoom lens is a group lens consisting of a plurality of lenses. (A) of FIG. 6 corresponds to an optical system arrangement at a wide angle end (shortest focal length state), (B) of FIG. 6 corresponds to an optical system arrangement in a middle area (intermediate focal length state), and (C) of FIG. 6 corresponds to an optical system arrangement at a telephoto end (longest focal length state).

The zoom lens includes a first lens group G1, a second lens group G2, a third lens group G3, a fourth lens group G4, and a fifth lens group G5 in order from an object side along an optical axis Z1. An optical aperture stop S1 is preferably arranged between the second lens group G2 and the third lens group G3 in the vicinity of the third lens group G3 on the side close to the object. Each of the lens groups G1 to G5 includes one or a plurality of lenses Lij. The reference symbol Lij denotes a j-th lens with the reference symbol affixed such that a lens arranged to be closest to the object in an i-th lens group is made into the first side and the reference symbol is gradually increased toward an image forming side.

The zoom lens can be mounted in an information portable terminal as well as imaging devices, for example, a video camera, and a digital camera. On the image side of the zoom lens, members are arranged according to the configuration of an imaging portion of a camera in which the lens is to be mounted. For example, an imaging element 100 such as a charge coupled device (CCD) or a complementary metal oxide semiconductor (CMOS) is arranged on an image forming surface (imaging surface) of the zoom lens. Various optical members GC may be arranged between the final lens group (fifth lens group G5) and the imaging element 100 according to the configuration of the camera side in which the lens is mounted.

The zoom lens is configured such that the magnification is changed by changing the gaps between the individual groups by moving at least the first lens group G1, the third lens group G3, and the fourth lens group G4 along the optical axis Z1. In addition, the fourth lens group G4 may be moved at focusing. It is preferable that the fifth lens group G5 is always fixed in magnification change and at focusing. The aperture stop S1 is moved together with the third lens group G3, for example. More specifically, as the magnification changes from the wide angle end to the middle area and further to the telephoto end, each lens group and the aperture stop S1 are moved, for example, from the state of (A) of FIG. 6 to the state of (B) and further to the state of (C) along the locus indicated by the solid line in the drawing.

The antireflection film 1 is provided on the outermost surfaces of the zoom lens of the outer surface (the surface on the side close to the object) of a lens L11 of the first lens group G1 and a lens L51 of the fifth lens group G5 which is the final lens group. That is, there is provided an embodiment of an optical member in which the lens L11 and the lens L51 are used as substrates and the antireflection film 1 is provided on the surfaces thereof. In the zoom lens, the antireflection film 1 may be provided on other lens surfaces in the same manner.

Since the antireflection film 1 of the first embodiment has high mechanical strength, the antireflection film can be provided on the outermost surface of the zoom lens which may be touched by a user and thus a zoom lens having very high antireflection performance can be formed.

EXAMPLES

Hereinafter, a main part configuration of the optical thin film of the present disclosure and the effect thereof will be described.

Example 1

A Ge film (film thickness: 0.68 nm) was formed as an anchor metal layer on a $SiO_2$ glass substrate, a gold film (film thickness: 0.125 nm) was continuously formed as a metal layer formed of a high standard electrode potential metal without being exposed to the atmospheric air, and further, a silver film (film thickness: 2 nm) was formed. Thereafter, an annealing treatment was performed in the atmospheric air at 300° C. for 5 minutes to prepare an example of a main part configuration of an optical thin film (Example 1). Here, gold was adopted as a high standard electrode potential metal having a standard electrode potential higher than that of silver.

Each film was formed under the following conditions using a sputtering apparatus (CFS-8EP) manufactured by Shibaura Mechatronics Co., Ltd. The conditions for forming each film were as follows. Hereinafter, the room temperature was 20° C. or higher and 30° C. or lower.

-Anchor Metal Layer Formation Conditions-
Direct current (DC) input power=20 W
Ar: 20 sccm, Depo pressure (film formation pressure): 0.45 Pa
Film formation temperature: room temperature
-Gold Film Formation Conditions-
DC input power=5 W
Ar: 30 sccm, Depo pressure: 0.8 Pa
Film formation temperature: room temperature
-Film Formation Conditions of Silver Layer-
DC input power=80 W
Ar: 15 sccm, Depo pressure: 0.27 Pa
Film formation temperature: room temperature With respect to the As-depo sample obtained in the preparation step of Example 1 and Example 1 after the annealing treatment, the concentration distribution of the contained elements in the depth direction (the film thickness direction) was measured. The As-Depo sample is a sample before an annealing treatment in which a laminate of a Ge film, a gold film, and a silver film is formed on a substrate. The concentration distribution was measured by using X-ray photoelectron spectroscopy (XPS). As the measurement device, Quantera SXM manufactured by ULVAC-PHI, Inc. was used. The results are shown in FIGS. 7 and 8.

Figure 7:
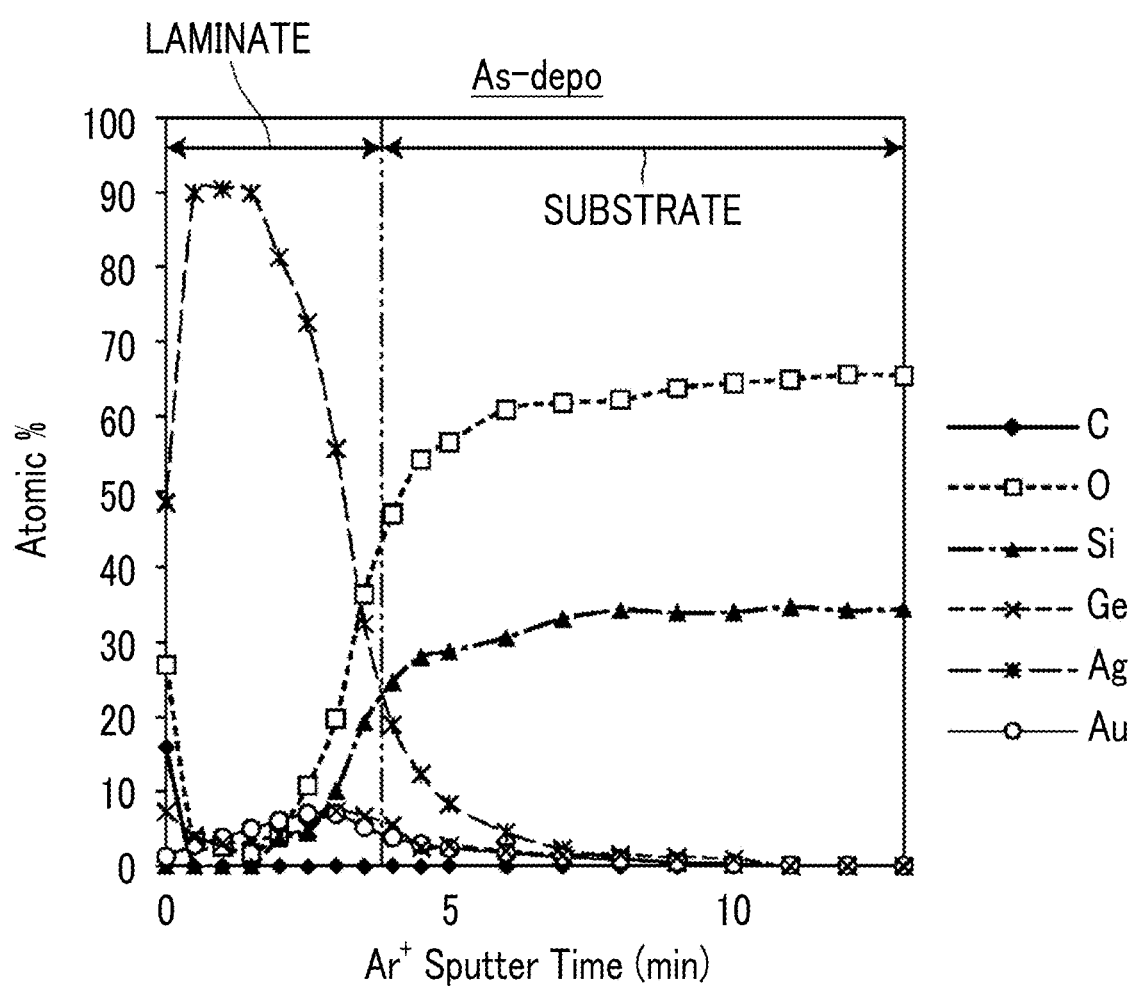
FIG. 7 is a diagram showing an element distribution in a film thickness direction from the surface of a laminate toward a substrate for an As-depo sample.
Figure 8:
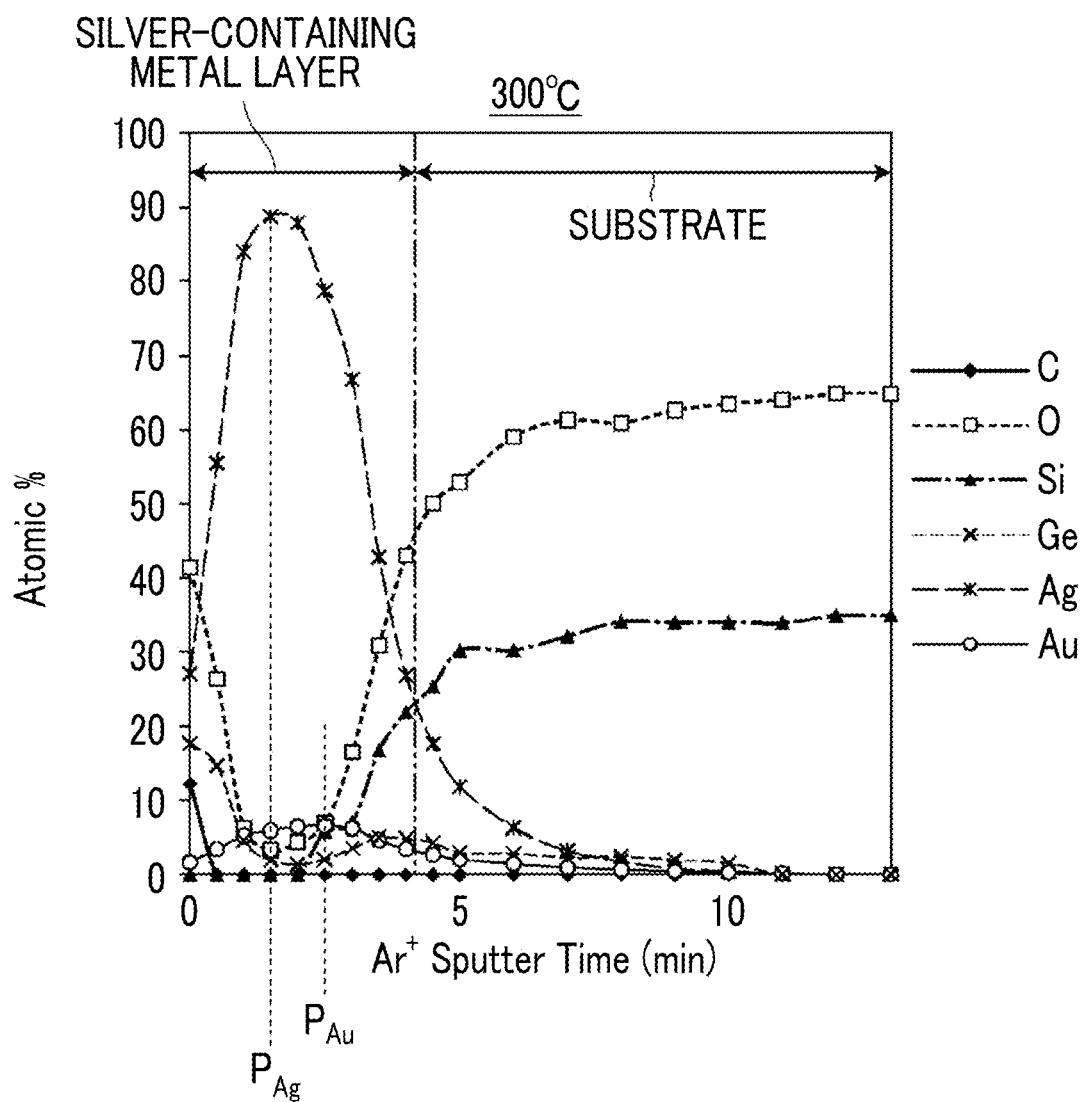
FIG. 8 is a diagram showing an element distribution in a film thickness direction from the surface of a silver-containing metal layer toward a substrate in a sample after an annealing treatment.

FIG. 7 is a graph showing the element distribution of the As-depo sample in the film thickness direction from the laminate surface side toward the substrate, and FIG. 8 is the graph showing the element distribution of the sample after the annealing treatment in the film thickness direction from the surface of the silver-containing metal layer toward the substrate. The lateral axis indicates the argon ion sputter time (Ar+ Sputter Time), which means the position in the film thickness direction.

In FIGS. 7 and 8, the respective boundaries between the substrate and the laminate and between the substrate and the silver-containing metal layer are defined as the positions in the thickness direction where the contents of silver and Si are reversed.

From the comparison of FIGS. 7 and 8, it is found that Ge is partially moved to the surface side of the silver-containing metal layer after the annealing treatment. However, as shown in FIG. 8, even after the annealing treatment, Ge has a gentle peak in the interface region between the silver-containing metal layer and the substrate. That is, also in Example 1 after the annealing treatment, the movement of Ge to the surface side is suppressed, and the anchor region is formed on the substrate side of the silver-containing metal layer. In FIG. 8, the number of oxygen atoms on the surface is increased as compared with FIG. 7. This increase in oxygen atoms indicates that Ge is oxidized to form $GeO_2$.

Further, as shown in FIG. 8, in the film thickness direction of the silver-containing metal layer, the peak position $P_{Au}$ of the gold concentration distribution was positioned closer to the substrate than the peak position $P_{Ag}$ of the silver concentration distribution.

Examples 2 and 3

Examples 2 and 3 were prepared in the same procedure as in Example 1 except that the thickness of the gold film was different from that of Example 1.

Example 4

Example 4 was prepared by changing the order of formation of the gold film and the anchor metal layer in the preparation step of Example 1. That is, a gold film was formed on a glass substrate, and an anchor metal layer and a silver film were formed on the gold film in this order. Thereafter, an annealing treatment was performed under the same conditions as in Example 1 to prepare an example of a main part configuration of an optical thin film of Example 4.

Examples 5 to 9

An anchor metal diffusion control layer formed of a material described in Table 2 below was formed on a glass substrate, and an anchor metal layer, a gold film, and a silver film were formed on the anchor metal diffusion control layer in this order. Thereafter, an annealing treatment was performed in the atmospheric air to prepare examples of main part configurations of optical thin films of Examples 5 to 9. In all of Examples 5 to 8, while the anchor metal diffusion control layer is constituted of $HfO_2$, the silver films have different thicknesses. In addition, in Example 9, the anchor metal diffusion control layer was constituted of $Nb_2O_5$. The conditions for preparing the anchor metal diffusion control layer were as follows. The Hamaker constant of $HfO_2$ is $11.2 \times 10^{-20}$ J, and the Hamaker constant of $Nb_2O_5$ is $A_{11} = 12 \times 10^{-20}$ J.

-Film Formation Conditions of Anchor Metal Diffusion Control Layer-

RF (alternating current) input power=400 W

Ar: 40 sccm, $O_2$: 2.5 sccm, Depo pressure (film formation pressure): 0.21 Pa

Film formation temperature: room temperature

Comparative Example 1

Comparative Example 1 had the same configuration as that of Example 1 except that no gold film was provided. A silver film was formed on an anchor metal layer, and an annealing treatment was performed under the same conditions as in Example 1 to prepare an example of a main part configuration of an optical thin film of Comparative Example 1.

Comparative Example 2

In the preparation step of Example 1, the order of forming the gold film and the silver film was changed. That is, a silver film was formed on the anchor metal layer, and a gold film was formed on the silver film. Thereafter, an annealing process was performed in the same manner as in Example 1 to prepare an example of a main part configuration of an optical thin film of Comparative Example 2.

Comparative Example 3

The configuration was such that no gold film was provided in Example 8. That is, an anchor metal diffusion control layer was formed on a glass substrate, and an anchor metal layer and a silver film were formed on the anchor metal diffusion control layer in this order. Thereafter, an annealing process was performed in the same manner as in Example 1 to prepare an example of a main part configuration of an optical thin film of Comparative Example 3.

<Evaluation of Flatness>

The film flatness of the silver-containing metal layer was evaluated for Examples and Comparative Examples prepared as described above.

-Evaluation Based on Absorbance of Visible Light-

The absorbance of light at a wavelength of 400 nm to 800 nm, which is the visible light region, was measured by a spectrophotometer. Specifically, using a spectrophotometer (HITACHI U-4000), the absorbance was measured at a scan speed of 600 nm/min in a wavelength range of 400 nm to 800 nm. In a case where plasmon absorption in the visible light region occurs, the absorbance increases. In a case where silver is granulated, plasmon absorption in the visible light region occurs. Thus, an increase in the absorbance of visible light means that the granulated portion is increased. That is, the lower the absorbance, the less silver granulation and the higher the flatness of the film. Here, in a wavelength range of 400 nm to 800 nm, those exhibiting an absorbance of more than 10% were evaluated as "occurred" for plasmon absorption, and those having an absorbance of 10% or less were evaluated as "not occurred" for plasmon absorption. The evaluation results are shown in Table 2.

Table 2 collectively shows the evaluations of the configurations, film thicknesses, and flatness of each of Examples and Comparative Examples.

TABLE 2

| | Anchor metal diffusion control layer | | Laminate lamination order | Silver-containing metal layer | | | |
|---|---|---|---|---|---|---|---|
| | | | | Anchor metal: Ge | High standard electrode potential metal: Au | Silver: Ag | |
| | Constitutional material | Film thickness | | Film thickness | Film thickness | Film thickness | Plasmon absorption |
| Example 1 | None | — | Ge/Au/Ag | 0.68 nm | 0.125 nm | 2 nm | Not occurred |
| Example 2 | None | — | Ge/Au/Ag | 0.68 nm | 0.25 nm | 2 nm | Not occurred |
| Example 3 | None | — | Ge/Au/Ag | 0.68 nm | 0.5 nm | 2 nm | Not occurred |
| Example 4 | None | — | Au/Ge/Ag | 0.68 nm | 0.125 nm | 2 nm | Not occurred |
| Example 5 | $HfO_2$ | 20 nm | Ge/Au/Ag | 0.68 nm | 0.125 nm | 2 nm | Not occurred |
| Example 6 | $HfO_2$ | 20 nm | Ge/Au/Ag | 0.68 nm | 0.125 nm | 1.5 nm | Not occurred |
| Example 7 | $HfO_2$ | 20 nm | Ge/Au/Ag | 0.68 nm | 0.125 nm | 1.25 nm | Not occurred |
| Example 8 | $HfO_2$ | 20 nm | Ge/Au/Ag | 0.68 nm | 0.125 nm | 1 nm | Not occurred |
| Example 9 | $Nb_2O_5$ | 20 nm | Ge/Au/Ag | 0.68 nm | 0.125 nm | 2 nm | Not occurred |
| Comparative Example 1 | None | — | Ge/Ag | 0.68 nm | None | 2 nm | Occurred |
| Comparative Example 2 | None | — | Ge/Ag/Au | 0.68 nm | 0.125 nm | 2 nm | Occurred |
| Comparative Example 3 | $HfO_2$ | 20 nm | Ge/Ag | 0.68 nm | None | 1 nm | Occurred |

Figure 9:
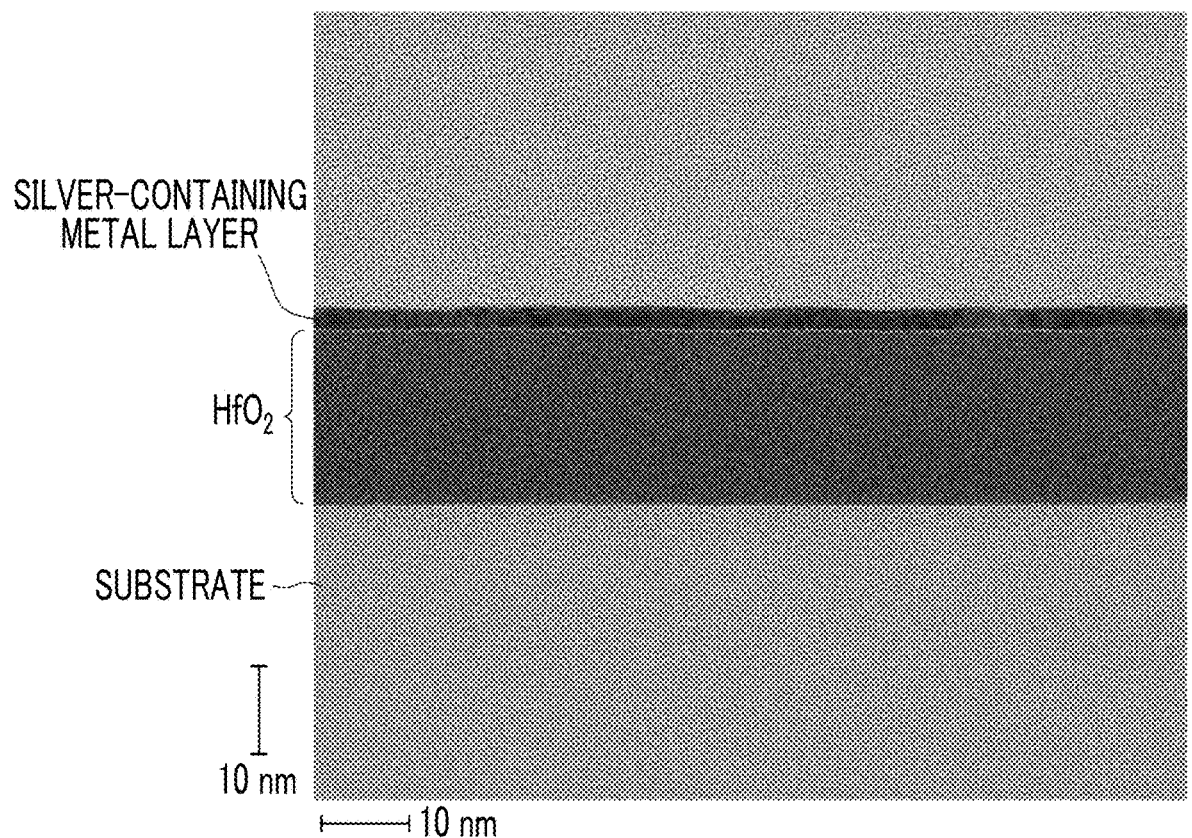
FIG. 9 is a cross-sectional transmission electron microscope (TEM) image of Example 5.

As shown in Table 2, in the main part configurations of the optical thin films of Examples 1 to 9, compared with the main part configurations of the optical thin films of Comparative Examples 1 to 3, the plasmon absorption was small, that is, the flatness of the silver-containing metal layer was high, and the granulation was suppressed. FIG. 9 is a cross-sectional transmission electron microscope (TEM) image of Example 5. From FIG. 9, it is clear that a very flat silver-containing metal layer is formed.

Although it is very difficult to realize an optical thin film including a silver-containing metal layer having a film thickness of less than 2 nm as a flat film, in Examples 6 to 8 including an anchor metal diffusion control layer, a silver-containing metal layer having a thickness of less than 2 nm in which granulation was sufficiently suppressed could be obtained. On the other hand, in a case where Au was not contained in the silver-containing metal layer even with the anchor metal diffusion control layer as in Comparative Example 3, sufficient flatness of a silver-containing metal layer having a film thickness of 1 nm could not be realized.

Comparative Example 2 contains Au in the silver-containing metal layer. However, it is considered that since the gold film is formed after the silver film is formed, the interaction with Ge under the silver film is not exhibited, and since the diffusion of Ge is widened, sufficient flattening of the silver-containing metal layer cannot be realized.

In the specification of WO2016/189848A, it is reported by the present applicant that the antireflection properties are largely different depending on the formation accuracy of the silver-containing metal layer in a case where the antireflection film is actually prepared. According to the specification of WO2016/189848A, as the flatness (uniformity) of the silver-containing metal layer increases, the deviation from the simulation value for the antireflection properties is reduced and the antireflection performance closer to the design specification can be obtained. That is, as in Examples described above, it is possible to obtain antireflection properties along with the design value by preparing an antireflective film using an optical thin film including a silver-containing metal layer having high flatness.

Next, the result of verifying the effect of providing the anchor metal diffusion control layer will be described. Here, the effect of flattening by the anchor metal diffusion control layer was verified as a configuration not including a metal having a standard electrode potential higher than that of silver.

Samples 11 to 17 each including an anchor metal diffusion control layer and a silver-containing metal layer including an anchor region and a cap region on a glass substrate were prepared, and the transparency and flatness thereof were evaluated.

<Method for Preparing Sample>

First, an anchor metal diffusion control layer formed of a material shown in Table 3 was formed on a glass substrate. The film was formed under the following conditions using a sputtering apparatus (CFS-8EP) manufactured by Shibaura Mechatronics Co., Ltd. An anchor metal layer formed of Ge and a silver film were also formed using the same sputtering apparatus.

-Film Formation Conditions of Anchor Metal Diffusion Control Layer-

RF (alternating current) input power=400 W
Ar: 40 sccm, $O_2$: 2.5 sccm, Depo pressure (film formation pressure): 0.21 Pa
Film formation temperature: room temperature After the anchor metal diffusion control layer was formed, an anchor metal layer formed of Ge was sequentially formed without being exposed to the atmospheric air.

-Anchor Metal Layer Formation Conditions-
Direct current (DC) input power=20 W
Ar: 20 sccm, Depo pressure (film formation pressure): 0.45 Pa
Film formation temperature: room temperature Further, after the anchor metal layer was formed, a silver layer was sequentially formed without being exposed to the atmospheric air.
-Film Formation Conditions of Silver Layer-
DC input power=80 W
Ar: 15 sccm, Depo pressure: 0.27 Pa
Film formation temperature: room temperature In the film formation of each layer, the film thickness of the anchor metal diffusion control layer was set to 20 nm, the film thickness of the anchor metal layer was set to 0.68 nm, and the film thickness of the silver film was set to 2 nm.

Thereafter, an annealing treatment was performed under the conditions of 300° C. and 5 minutes in the atmospheric air for each of Examples and Comparative Examples.

The film flatness of Samples 11 to 17 obtained as described above was evaluated.

Figure 10:
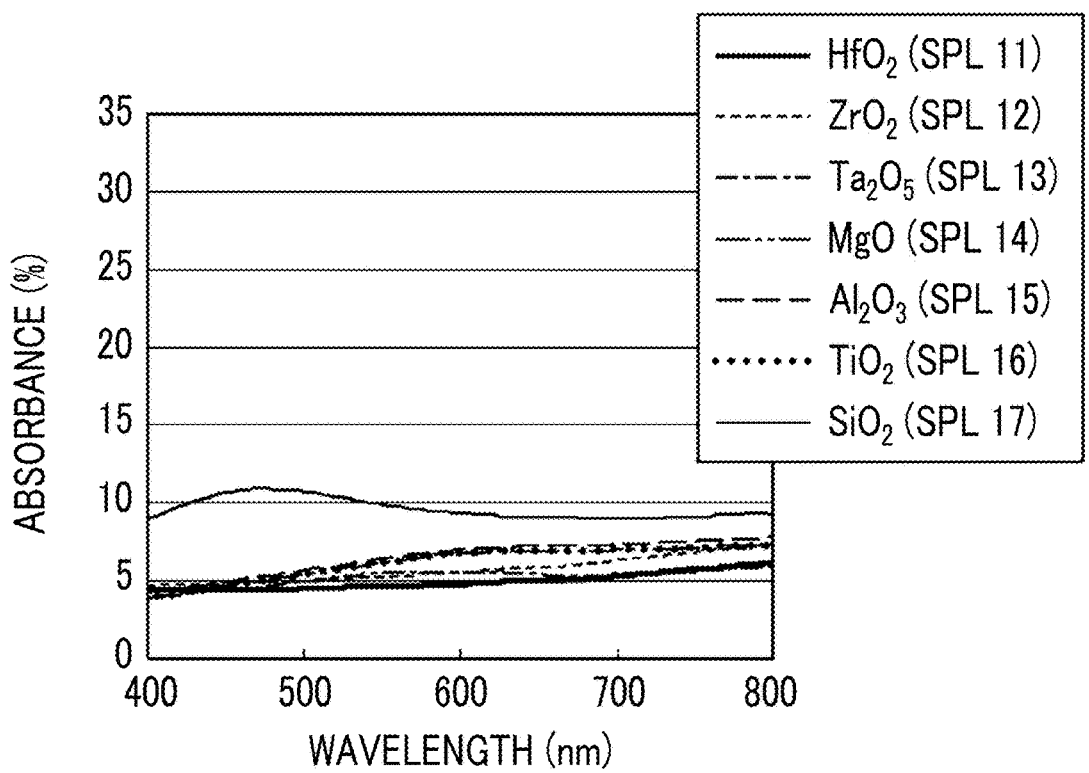
FIG. 10 is a diagram showing the wavelength dependency of the absorbance of Samples 11 to 17.

<Evaluation of Flatness>
-Evaluation Based on Absorbance of Visible Light-
The same evaluation as the evaluation described in the above Examples and Comparative Examples was performed. FIG. 10 shows the measurement results of each example and is a graph showing the wavelength dependency of absorbance.

-Electrical Resistivity Evaluation of Silver-Containing Metal Layer-
The electrical resistivity (Ωcm) of each sample was measured by a four-terminal method using an ESP probe of LORESTA GP, manufactured by Mitsubishi Chemical Corporation. The measurement results are shown in Table 3.

Since the electrical resistivity of the silver-containing metal layer is increased due to a partial increase in resistance in a discontinuous part in the silver-containing metal layer or in a part where the film thickness changes, the electrical resistivity is an indicator showing the uniformity (flatness) of the film. The electric resistivity decreases as the flatness of the film increases, and the electric resistivity increases as the flatness decreases.

The Hamaker constant in Table 3 was obtained based on the above-described measurement method.

Table 3 collectively shows the film configurations and measurement (evaluation) results of Samples 11 to 17 prepared and evaluated by the above methods.

TABLE 3

| | Anchor metal diffusion control layer | | | Silver-containing metal layer | | | |
| --- | --- | --- | --- | --- | --- | --- | --- |
| | Con-stitutional material | Film thickness | Hamaker constant ($\times 10^{-20}$ J) | Anchor metal layer (film thickness) | Silver film thickness | Plasmon absorption | Resistivity (Ω cm) |
| Sample 11 | $HfO_2$ | 20 nm | 11.2 | Ge (0.68 nm) | 2 nm | Not occurred | $1.20 \times 10^{-5}$ |
| Sample 12 | $ZrO_2$ | 20 nm | 11.8 | Ge (0.68 nm) | 2 nm | Not occurred | $1.40 \times 10^{-5}$ |
| Sample 13 | $Ta_2O_5$ | 20 nm | 9.5 | Ge (0.68 nm) | 2 nm | Not occurred | $1.77 \times 10^{-5}$ |
| Sample 14 | MgO | 20 nm | 7.3 | Ge (0.68 nm) | 2 nm | Not occurred | $2.40 \times 10^{-5}$ |
| Sample 15 | $Al_2O_3$ | 20 nm | 9.6 | Ge (0.68 nm) | 2 nm | Not occurred | $1.81 \times 10^{-5}$ |
| Sample 16 | $TiO_2$ | 20 nm | 10 | Ge (0.68 nm) | 2 nm | Not occurred | $1.70 \times 10^{-5}$ |
| Sample 17 | $SiO_2$ | 20 nm | 5.6 | Ge (0.68 nm) | 2 nm | Occurred | $4.50 \times 10^{-5}$ |

Figure 11:
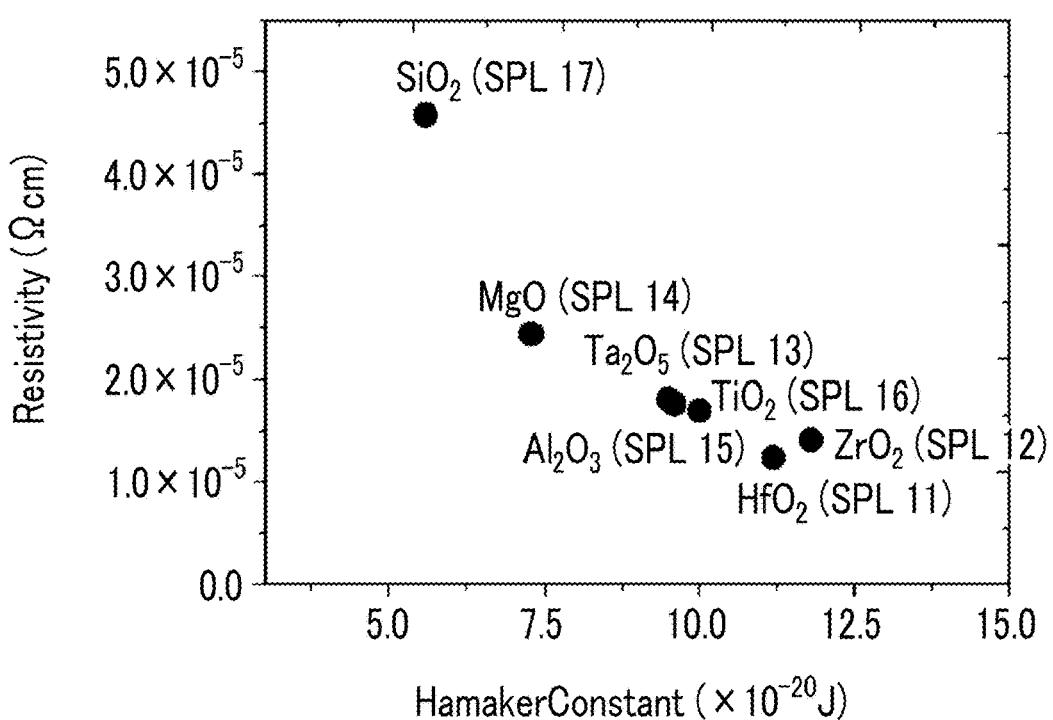
FIG. 11 is a diagram showing a relationship of the Hamaker constant of an anchor metal diffusion control layer and the electrical resistivity of a silver film in Samples 11 to 17.

As shown in Table 3, regarding Samples 11 to 16 in which the Hamaker constant of the anchor metal diffusion control layer was $7.3 \times 10^{-20}$ J or more, compared to Sample 17, the result that the plasmon absorption of visible light was suppressed and the electrical resistivity was low was obtained (refer to FIG. 11). That is, it is considered that Samples 11 to 16 include a silver-containing metal layer having high flatness.

Further, the result of the verification of the effect of the anchor metal diffusion control layer including Hf will be described. The distribution of the amount of Ge in the depth direction (film thickness direction) was measured for the silver-containing metal layers of Sample 11 using $HfO_2$ for the anchor metal diffusion control layer obtained as described above and Sample 17 using $SiO_2$ for the anchor metal diffusion control layer obtained as described above. For the measurement, XPS using Quantera SXM manufactured by ULVAC-PHI Inc. was used.

Figure 12:
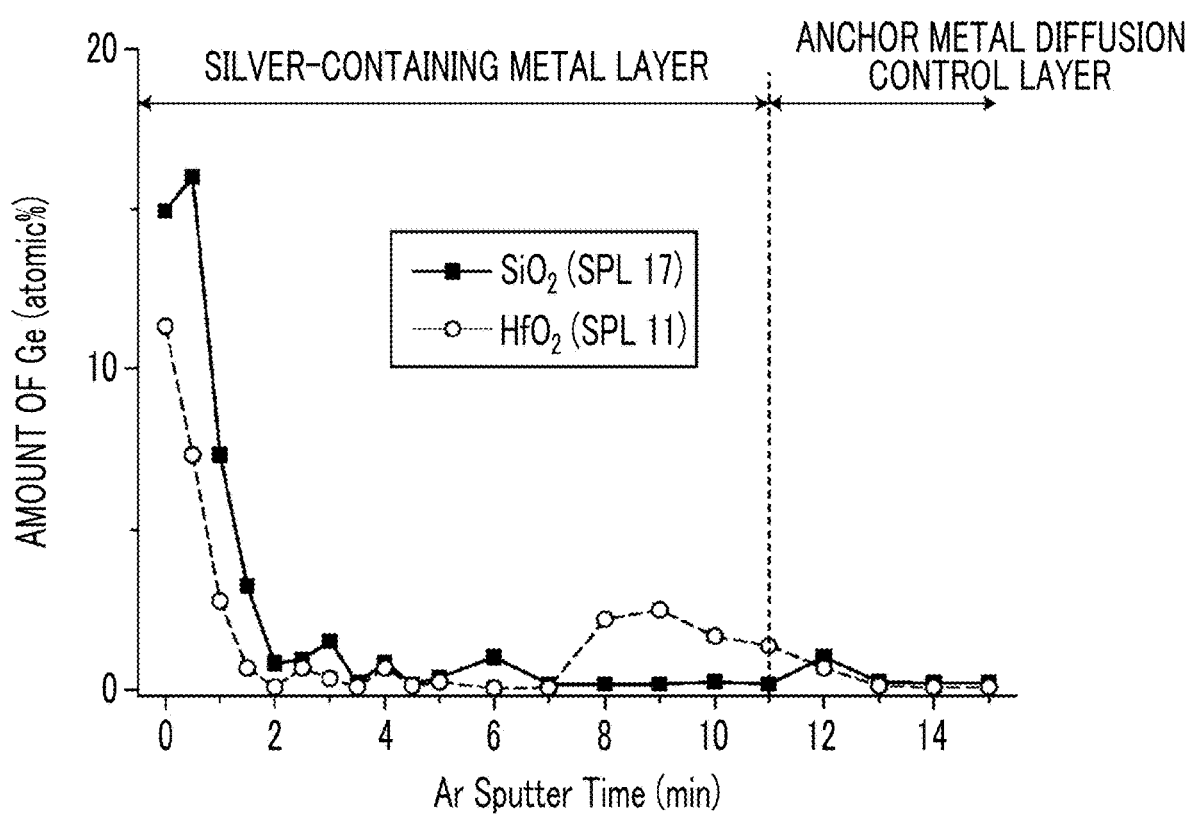
FIG. 12 is a diagram showing the concentration distribution of elements in a film thickness direction from the surface of a silver-containing metal layer toward the substrate in Samples 11 and 17.

FIG. 12 is a graph showing the Ge element distribution in the depth direction from the lamination direction surface side to the anchor metal diffusion control layer in Samples 11 and 17 obtained by XPS. The excavation was performed by $Ar^+$ sputtering and elemental analysis in the depth direction was performed. In FIG. 12, the lateral axis 0 is the surface position of the sample.

As shown in FIG. 12, it is found that in a case where $HfO_2$ is used for the anchor metal diffusion control layer, a region in which the amount of Ge, which is an anchor metal, increases is provided at the interface region between the silver-containing metal layer region and the anchor metal diffusion control layer, and thus an anchor region is formed. On the other hand, it is found that in a case where $SiO_2$ is used for the anchor metal diffusion control layer, the amount of Ge decreases at the interface between the silver-containing region and the anchor metal diffusion control layer and most of Ge of the anchor metal layer formed on the anchor metal diffusion control layer is moved to the surface side of the silver-containing metal layer.

From the result, it was confirmed that HfO$_2$ having a high Hamaker constant could effectively suppress the diffusion of Ge. It is presumed that since the diffusion of Ge is suppressed, the effect of suppressing the granulation of the silver-containing metal layer by the anchor metal is maintained, and the flattening of the silver-containing metal layer can be realized.

Next, Examples for exhibiting the effect of the antireflection film including the fine uneven layer on the surface, which is the optical thin film of the present disclosure, will be described.

Example 10

Table 4 below shows the layer configuration, the film thickness, and the refractive index and extinction coefficient of each layer used in the simulation of the wavelength dependency of the reflectance of the antireflection film of Example 10.

After forming the uppermost layer of Al, the film was immersed in boiling water for 5 minutes to perform a hot water treatment. After the hot water treatment, the uppermost layer of Al became a boehmite layer having an uneven boehmite layer (fine uneven layer) on the surface.

In addition, the refractive index of the fine uneven layer in the antireflection film prepared as described above was measured with a spectroscopic ellipsometer. The refractive index of the boehmite layer was changed to 1 to 1.36 from the surface side toward the silver-containing metal layer side.

Figure 13:
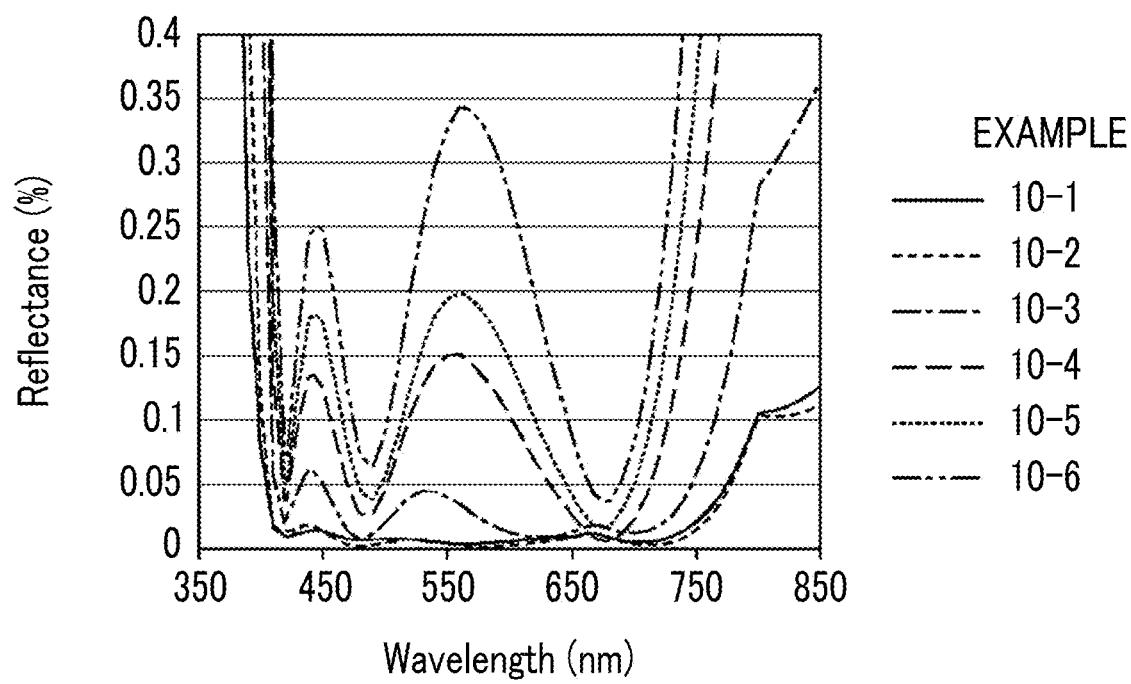
FIG. 13 is a diagram showing the wavelength dependency of the reflectance obtained by simulation of an antireflection film of Example 10.

FIG. 13 shows the wavelength dependency of the reflectance at a wavelength of 400 nm to 800 nm obtained by simulation for the antireflection film of the above configuration. In the simulation, the data obtained by measuring the refractive index with the above-mentioned spectroscopic ellipsometer was used as the refractive index of the fine uneven layer. Also in the following examples, the data of the refractive index of the fine uneven layer is the same.

TABLE 4

| Example 10: layer configuration | | Material | Refractive index (@ 540 nm) | Extinction coefficient | 10-1 | 10-2 | 10-3 | 10-4 | 10-5 | 10-6 |
|---|---|---|---|---|---|---|---|---|---|---|
| | | | | | \multicolumn{6}{c}{Film thickness (nm)} | | | | | |
| Fine uneven layer | | Al$_2$O$_3$ (H$_2$O) | 1-1.36 | 0 | \multicolumn{6}{c}{Hot water treatment on 16 nm of Al} | | | | | |
| Dielectric layer | | MgF$_2$ | 1.38464 | 0 | 6 | 6 | 6 | 6 | 6 | 6 |
| Silver-containing metal layer | | Ag/Au/Ge | 0.3577 | 3.83947 | 1.89 | 2 | 2.5 | 3 | 3.2 | 3.5 |
| Interlayer | 1 (anchor metal diffusion control layer) | Nb$_2$O$_5$ | 2.3672 | 0 | 10.48 | 10.99 | 10.74 | 12.38 | 12.77 | 13.21 |
| | 2 | SiON | 1.5181 | 0.00275 | 90.01 | 92.53 | 106.3 | 101.7 | 101.17 | 99.54 |
| | 3 | Nb$_2$O$_5$ | 2.3672 | 0 | 9.87 | 11.07 | 14.11 | 16.77 | 18.02 | 19.58 |
| | 4 | SiON | 1.5181 | 0.00275 | 59.22 | 58.23 | 46.2 | 40.82 | 37.19 | 30.94 |
| | 5 | Nb$_2$O$_5$ | 2.3672 | 0 | 17.56 | 20.78 | 31.75 | 38.77 | 43.18 | 53.69 |
| | 6 | SiON | 1.5181 | 0.00275 | 37.76 | 39.1 | 31.84 | 27.44 | 24.83 | 19.19 |
| | 7 | Nb$_2$O$_5$ | 2.3672 | 0 | 8.5 | 11.13 | 18 | 21.15 | 22.36 | 24.23 |
| Substrate | | S-LAH53 | 1.8117 | 0 | — | — | — | — | — | — |

The antireflection film of Example 10 was prepared as follows.

A glass material Ohara S-LAH53 was used as a substrate. All the refractive indices in Table 4 are shown as refractive indices at a wavelength of 540 nm. Seven layers of Nb$_2$O$_5$ and SiON were sequentially and alternately formed on the curved surface of the lens of the substrate by a radical assisted sputtering (RAS) apparatus to form an interlayer. The Nb$_2$O$_5$ layer finally formed functions as an anchor metal diffusion control layer. Further, a Ge film as an anchor metal layer, an Au film as a layer formed of a high standard electrode potential metal, and a silver film were sequentially laminated. The film thickness of the silver-containing metal layer described in Table 4 is the total thickness of the anchor metal layer and the silver film. The antireflection films of Examples 10-1 to 10-6 were prepared such that the total film thickness of each respective film was 1.89 nm, 2 nm, 2.5 nm, 3 nm, 3.2 nm, and 3.5 nm. In the antireflection films of six examples, the film thickness of the Ge films is 0.68 nm, the film thickness of the Au films is 0.125 nm, and only the film thicknesses of the silver films are different. Then, an annealing treatment was performed at 300° C. for 5 minutes in the atmospheric air. Thereafter, an MgF$_2$ layer was formed at a thickness of 6 nm and an Al layer was formed at a thickness of 16 nm by vacuum evaporation.

As shown in FIG. 13, a good reflectance of 0.35% or less was obtained for all the antireflection films of Examples 10-1 to 10-6 in a wavelength range of 450 nm to 700 nm. In Example 10-6 in which the film thickness of the silver-containing metal layer is 3.5 nm, and in Example 10-5 in which the film thickness of the silver-containing metal layer is 3.2 nm, the reflectance is largely changed. It is considered that the film thickness of the silver-containing metal layer is preferably less than 3.5 nm. In addition, in a case where the film thickness of the silver-containing metal layer was 3.2 nm or less (Examples 10-1 to 10-5), the reflectance could be set to 0.2% or less in a wavelength range of 450 nm to 700 nm. Further, in a case where the film thickness of the silver-containing metal layer was 3.0 nm or less (Examples 10-1 to 10-4), the reflectance could be set to 0.15% or less in a wavelength range of 450 nm to 700 nm. Further, in a case where the thickness of the silver-containing metal layer was 2.5 nm or less (Examples 10-1 to 10-3), the reflectance could be as extremely low as 0.05% or less in a wavelength range of 450 nm to 700 nm. In a case where the thickness of the silver-containing metal layer was 2.0 nm or less (Examples 10-1 and 10-2), a particularly low reflectance of 0.02% or less could be obtained in a wavelength range of 450 nm to 700 nm.

Example 11

The layer configuration of Example 11 is shown in Table 5.

TABLE 5

| Example 11: layer configuration | | Material | Refractive index (@540 nm) | Extinction coefficient | Film thickness (nm) |
|---|---|---|---|---|---|
| Fine uneven layer | | $Al_2O_3$ ($H_2O$) | 1-1.36 | 0 | Hot water treatment on 16 nm of Al |
| Dielectric layer | | $MgF_2$ | 1.38464 | 0 | 6 |
| Silver-containing metal layer | | Ag/Au/Ge | 0.3577 | 3.83947 | 3 |
| Inter-layer | 1 (anchor metal diffusion control layer) | $Si_3N_4$ | 1.98657 | 0.00027 | 21.82 |
| | 2 | SiON | 1.5181 | 0.00275 | 96.07 |
| | 3 | $Nb_2O_5$ | 2.3672 | 0 | 21.61 |
| | 4 | SiON | 1.5181 | 0.00275 | 31.45 |
| | 5 | $Nb_2O_5$ | 2.3672 | 0 | 47.51 |
| | 6 | SiON | 1.5181 | 0.00275 | 23.34 |
| | 7 | $Nb_2O_5$ | 2.3672 | 0 | 22.15 |
| Substrate | | S-LAH53 | 1.8117 | 0 | — |

The antireflection film of Example 11 was prepared as follows.

A glass material Ohara S-LAH53 was used as a substrate. All the refractive indices in Table 5 are shown as refractive indices at a wavelength of 540 nm. Seven layers of $Nb_2O_5$ and SiON were sequentially and alternately formed on the curved surface of the lens of the substrate by a radical assisted sputtering (RAS) apparatus, and $Si_3N_4$ was laminated on the finally laminated SiON to form an interlayer. The finally formed $Si_3N_4$ functions as an anchor metal diffusion control layer. Further, a Ge film as an anchor metal layer, an Au film as a layer formed of a high standard electrode potential metal, and a silver film were sequentially laminated. Here, the film thickness of the Ge film was 0.68 nm, the film thickness of the Au film was 0.125 nm, and the film thickness of the silver-containing metal layer was 3 nm. Then, an annealing treatment was performed at 300° C. for 5 minutes in the atmospheric air. Thereafter, an $MgF_2$ layer was formed at a thickness of 6 nm and an Al layer was formed at a thickness of 16 nm by vacuum evaporation.

After forming the uppermost layer of Al, the film was immersed in boiling water for 5 minutes to perform a hot water treatment. After the hot water treatment, the uppermost layer of Al became a boehmite layer having an uneven boehmite layer (fine uneven layer) on the surface.

Figure 14:
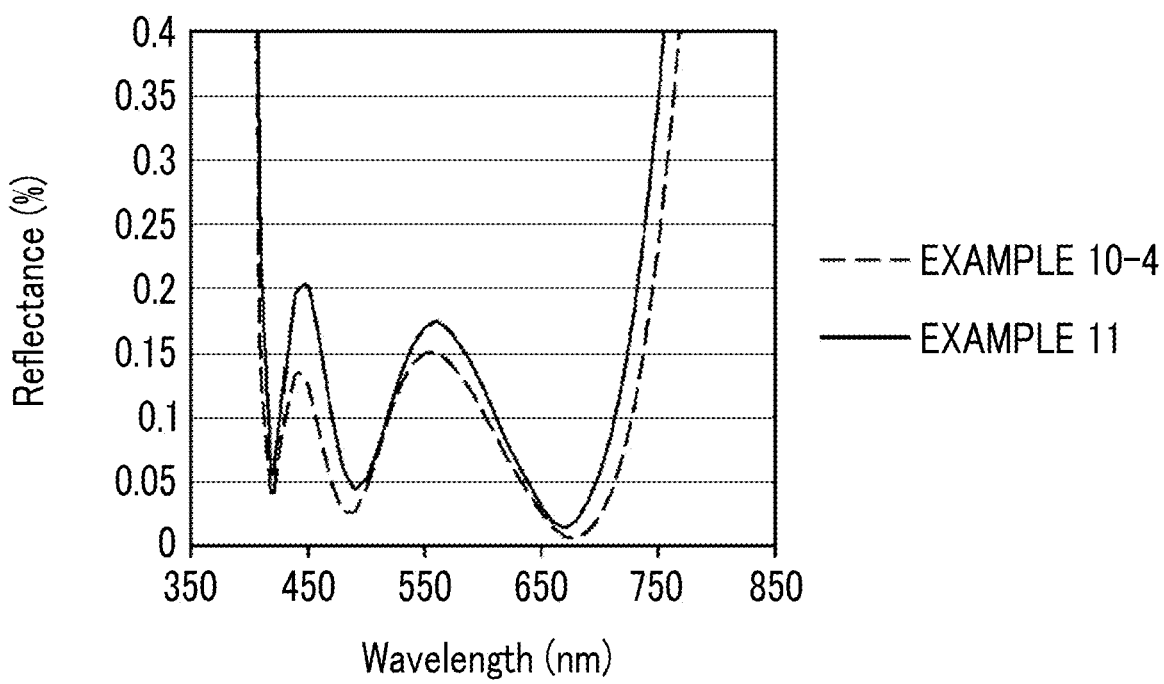
FIG. 14 is a diagram showing the wavelength dependency of the reflectance obtained by simulation of an antireflection film of Example 11.

FIG. 14 shows the wavelength dependency of the reflectance obtained by simulation for the antireflection film of Example 11 of the above configuration. FIG. 14 shows the result of Example 10-4 together. The anchor metal diffusion control layer is different in Example 11 and Example 10-4 in which the silver-containing metal layers have the same thickness. As shown in FIG. 14, in Example 10-4 in which the anchor metal diffusion control layer was formed of $Nb_2O_5$, a lower reflectance could be obtained in the visible light region than in Example 11 in which the anchor metal diffusion control layer was formed of $Si_3N_4$.

The disclosure of Japanese Patent Application No. 2018-013884 filed on Jan. 30, 2018 is incorporated in the present specification by reference in its entirety.

All documents, patent applications, and technical standards described in the present specification are incorporated herein by reference to the same extent as if each individual document, patent application, or technical standard were specifically and individually indicated to be incorporated by reference.

What is claimed is:

1. An optical thin film that is provided on a substrate, the film comprising, in order, from the substrate side:
   an interlayer;
   a silver-containing metal layer that contains silver; and
   a dielectric layer,
   wherein an anchor region including an oxide of an anchor metal is provided in an interface region of the silver-containing metal layer on a side close to the interlayer,
   a cap region including an oxide of the anchor metal is provided in an interface region of the silver-containing metal layer on a side close to the dielectric layer,
   a film thickness of the silver-containing metal layer including the anchor region and the cap region is 6 nm or less,
   the silver-containing metal layer contains a high standard electrode potential metal which is a metal having a standard electrode potential higher than that of silver, and a peak position of a concentration distribution of the high standard electrode potential metal in a film thickness direction of the silver-containing metal layer is positioned closer to the interlayer than a peak position of a silver concentration distribution.

2. The optical thin film according to claim 1, wherein the high standard electrode potential metal is gold.

3. The optical thin film according to claim 1, wherein the anchor region includes an unoxidized anchor metal that is not oxidized, and a content ratio of the oxide of the anchor metal is larger than a content ratio of the unoxidized anchor metal.

4. The optical thin film according to claim 1, wherein the anchor metal is Ge, Sn, In, Ga, or Zn.

5. The optical thin film according to claim 1, further comprising:
   an anchor metal diffusion control layer having a Hamaker constant of $7.3 \times 10^{-20}$ J or more between the interlayer and the silver-containing metal layer.

6. The optical thin film according to claim 5, wherein the anchor metal diffusion control layer includes a metal oxide, a metal nitride, a metal oxynitride or a metal carbide.

7. The optical thin film according to claim 5, wherein the anchor metal diffusion control layer contains a Hf oxide.

8. The optical thin film according to claim 1, further comprising:
   a fine uneven layer having an alumina hydrate as a main component on a surface of the dielectric layer.

9. The optical thin film according to claim 8, wherein a film thickness of the silver-containing metal layer is less than 3.5 nm.

10. An optical element comprising:
    an antireflection film formed of the optical thin film according to claim 1.

11. An optical system comprising:
    a group lens in which a surface of the optical element according to claim 10 on which the antireflection film is provided is arranged on outermost surfaces.

* * * * *